United States Patent
Mao

(10) Patent No.: US 12,113,466 B2
(45) Date of Patent: Oct. 8, 2024

(54) MULTI-HARMONIC FIELD ORIENTED CONTROL FOR POLY-PHASE MOTOR/GENERATOR SYSTEMS

(71) Applicant: Quantentech Limited, Grand Cayman (KY)

(72) Inventor: Hengchun Mao, Allen, TX (US)

(73) Assignee: Quantentech Limited, Grand Cayman (KY)

( * ) Notice: Subject to any disclaimer, the term of this patent is extended or adjusted under 35 U.S.C. 154(b) by 470 days.

(21) Appl. No.: 17/645,989

(22) Filed: Dec. 26, 2021

(65) Prior Publication Data

US 2022/0209703 A1 Jun. 30, 2022

Related U.S. Application Data

(60) Provisional application No. 63/130,821, filed on Dec. 27, 2020.

(51) Int. Cl.
*H02P 27/08* (2006.01)
*H02K 3/28* (2006.01)
*H02P 21/22* (2016.01)

(52) U.S. Cl.
CPC .............. *H02P 27/08* (2013.01); *H02K 3/28* (2013.01); *H02P 21/22* (2016.02)

(58) Field of Classification Search
CPC .......... H02P 21/10; H02P 21/22; H02P 27/08; H02K 3/28
See application file for complete search history.

(56) References Cited

U.S. PATENT DOCUMENTS

| | | | |
|---|---|---|---|
| 6,710,495 B2 * | 3/2004 | Lipo | H02K 3/28 310/184 |
| 10,250,175 B2 * | 4/2019 | Seguchi | H02K 1/26 |
| 10,312,838 B2 * | 6/2019 | Stichweh | H02P 25/22 |
| 11,316,463 B2 * | 4/2022 | Beniakar | H02K 3/28 |
| 11,870,377 B2 * | 1/2024 | Mao | H02P 25/22 |

* cited by examiner

Primary Examiner — Thai T Dinh
(74) Attorney, Agent, or Firm — AP3 Law Firm PLLC

(57) ABSTRACT

A method includes configuring a motor drive system with a motor/generator and a plurality of inverters coupled to the motor/generator, configuring a plurality of active harmonic planes to generate a torque on each of the active harmonic planes, and applying a harmonic plane synchronization mechanism to the plurality of active harmonic planes so that torque components and magnetizing components of currents are controlled in coordination on different active harmonic planes to output a desired torque from the motor/generator.

20 Claims, 14 Drawing Sheets

MULTI-HARMONIC FIELD ORIENTED CONTROL FOR POLY-PHASE MOTOR/GENERATOR SYSTEMS

This application claims the benefit of U.S. Provisional Application No. 63/130,821, filed on Dec. 27, 2020, entitled "Multi-harmonic Field Oriented Control for Polyphase Motors and Generators," which application is hereby incorporated herein by reference.

TECHNICAL FIELD

The present disclosure relates to an electric drive system, and, in particular embodiments, to innovative technologies which improve the performance of poly-phase motor systems.

BACKGROUND

High performance motor and generator systems are widely required for many industrial, automotive and consumer applications. In comparison with single-phase or three-phase machines, poly-phase machines including motors and generators can generally achieve high performance in various aspects including efficiency, power density, torque density, reliability and cost. To achieve a high performance motor/generator and drive system, various harmonic injection techniques may be utilized. Traditionally, the harmonic injection techniques have been used mainly to improve the voltage capability of power inverters without modifying field-oriented control (FOC). The drive system is controlled by a FOC method based on the fundamental frequency. The impact of the harmonic injection on other performance indexes, as well as achieving better performance in poly-phase machines with better control strategy, has not been fully investigated, especially for induction machines where harmonic currents in stator windings tend to generate excessive power losses in the rotor without increasing the torque output, and thus are usually avoided in the traditional three-phase designs. This disclosure presents a field-oriented harmonic injection control mechanism to integrate the harmonic injection techniques with the FOC method in a poly-phase system so as to achieve energy transfer and torque generation at multiple frequencies, thus attaining better efficiency and power density of the poly-phase motor/generator and the system.

SUMMARY

These and other problems are generally solved or circumvented, and technical advantages are generally achieved, by preferred embodiments of the present disclosure which provide a high performance implementation of a motor drive system through configuring multi harmonics to transfer power in the motor drive system.

In accordance with an embodiment, a method comprises configuring a motor drive system with a motor/generator and a plurality of inverters coupled to the motor/generator, configuring a plurality of active harmonic planes to generate a torque on each of the active harmonic planes, and applying a harmonic plane synchronization control mechanism to the plurality of active harmonic planes so that torque components and magnetizing components of currents are controlled in coordination on different active harmonic planes to output a desired torque from the motor/generator.

In accordance with another embodiment, a system comprises a motor/generator having a plurality of windings, a rotor and a stator magnetically coupled to the rotor, a plurality of power converters connected to respective windings, wherein the plurality of power converters is configured to control currents of the plurality of windings, and a controller configured to configure a plurality of harmonic currents in a plurality of active harmonic planes to generate a torque on each of the plurality of active harmonic planes, and apply a harmonic plane synchronization control mechanism to the plurality of harmonic currents in different harmonic planes so that current control on different harmonic planes is coordinated to output a desired torque from the motor/generator.

In accordance with yet another embodiment, a method comprises configuring a motor drive system with a motor/generator and an inverter, wherein the motor/generator has a plurality of windings arranged into a plurality of winding groups, and the inverter has a plurality of power converter groups, and wherein each power converter group is configured to control currents of a winding group, configuring a plurality of harmonic currents in a plurality of active harmonic planes to generator a torque on each active harmonic plane, and applying a harmonic plane synchronization control mechanism to the plurality of active harmonic planes so that current control on different harmonic planes is coordinated to output a desired torque from the motor/generator.

An advantage of an embodiment of the present disclosure is using multi harmonics to transfer power so as to improve the operation performance of a motor drive system.

The foregoing has outlined rather broadly the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiment disclosed may be readily utilized as a basis for modifying or designing other structures or processes for carrying out the same purposes of the present disclosure. It should also be realized by those skilled in the art that such equivalent constructions do not depart from the spirit and scope of the disclosure as set forth in the appended claims.

BRIEF DESCRIPTION OF THE DRAWINGS

For a more complete understanding of the present disclosure, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the various embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present disclosure provides many applicable inventive concepts that can be embodied in a wide variety of specific contexts. The specific embodiments discussed are merely illustrative of specific ways to make and use the disclosure, and do not limit the scope of the disclosure.

The present disclosure will be described with respect to preferred embodiments in a specific context, namely a high-performance motor drive system. The motor drive system may be applied to a variety of electric or hybrid vehicles, robots, drones, appliances, industrial drives, and/or other applications. Throughout the description, poly-phase induction motors (e.g., dynamically reconfigurable induction motors) are used as an example, but the technology discussed in the present disclosure generally can be applied to other machines such as conventional induction machines, permanent magnet motors, synchronous motors, reluctance motors (e.g., switched reluctance motors or synchronous reluctance motors), and various generator counterparts. Hereinafter, various embodiments will be explained in detail with reference to the accompanying drawings.

Figure 1:
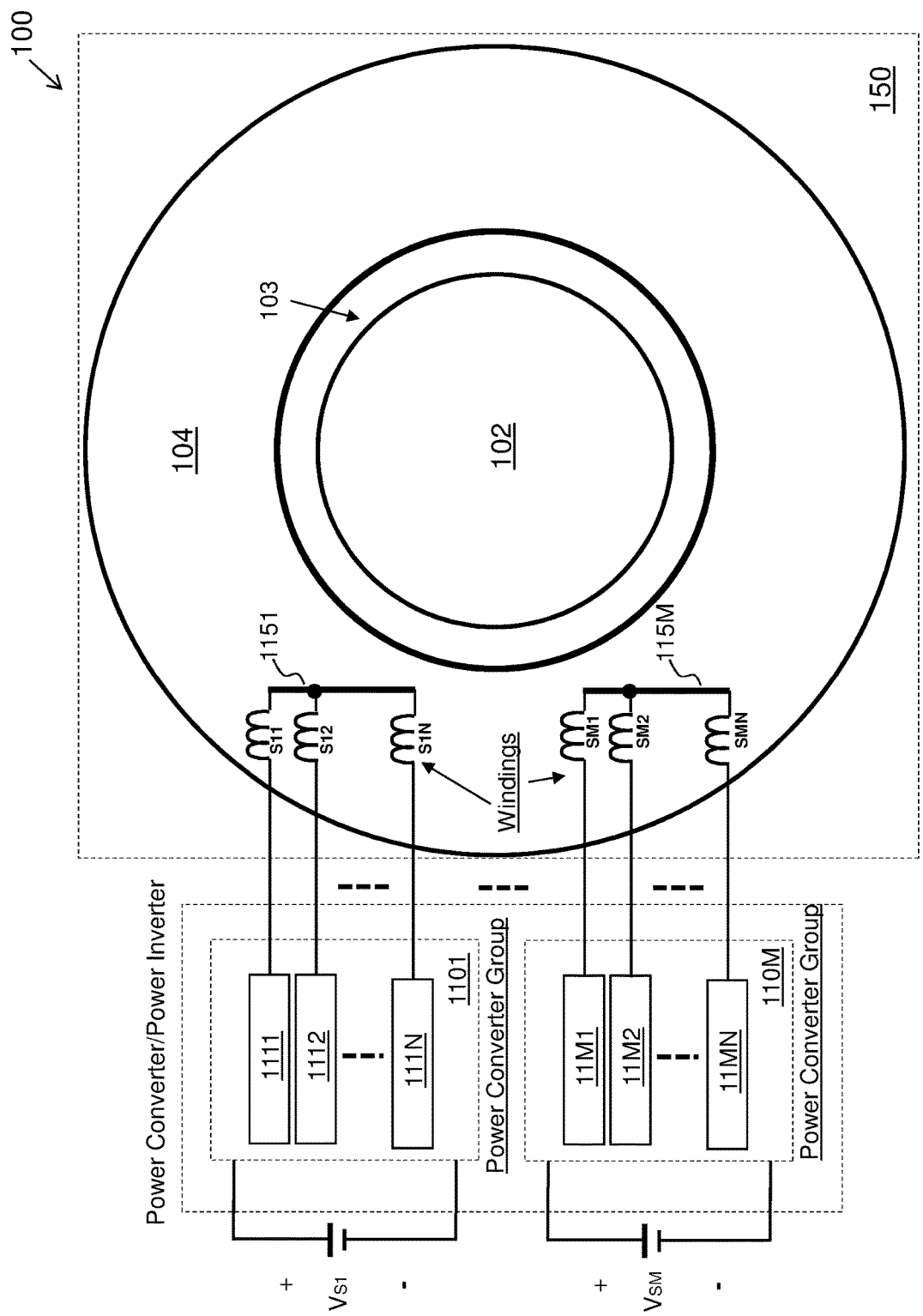
FIG. 1 illustrates a block diagram of a poly-phase motor system in accordance with various embodiments of the present disclosure.

Some poly-phase induction motors may be dynamically reconfigured to have different number of poles and different number of phases within a pair of poles through adjusting the phase shift between currents of neighboring windings. Such poly-phase induction motors may be alternatively referred to as dynamically reconfigurable induction motors (DR induction motors). There are different ways to arrange the windings in a DR induction motor. FIG. 1, as an example, is used to explain various embodiments of the present disclosure without limiting the scope of the present disclosure to this particular construction.

FIG. 1 illustrates a block diagram of poly-phase motor system which can be used as a reconfigurable motor system in accordance with various embodiments of the present disclosure. The reconfigurable motor system 100 comprises a stator 104, a rotor 102 and an air gap 103. The rotor 102 may have a squirrel cage construction. The stator 104 comprises a plurality of stator windings. The plurality of stator windings may be embedded in the stator core. More particularly, the stator core may comprise a plurality of slots. Each slot is employed to accommodate one stator winding. Alternatively, depending on different applications and design needs, each slot may be employed to accommodate multiple stator windings. In addition, the reconfigurable motor system may not include a stator core (e.g., a coreless motor), or there is no slot in the stator core.

As shown in FIG. 1, the plurality of stator windings may be divided into a plurality of groups with M groups shown in FIG. 1, where M is a predetermined integer. The stator windings of each group may be connected by a connection ring or a connection bar. For example, the stator windings S11-S1N of the first group are connected by a first connection ring 1151 as shown in FIG. 1. Likewise, the stator windings SM1-SMN of the Mth group are connected by an Mth connection ring 115M as shown in FIG. 1. In FIG. 1, the connection rings are shown floating (e.g., the connection rings are electrically isolated from each other as shown in FIG. 1). In this disclosure, a connection ring may not be an enclosed shape, and thus can be a connection bar or another shape. If some of the M input power sources are electrically isolated from each other, some of the connection rings 1151-115M may be electrically connected together, or form a single connection ring.

Furthermore, the reconfigurable motor system 100 comprises a plurality of power converter groups. Each power converter group is connected between a power source and a corresponding stator winding group. As shown in FIG. 1, a first power converter group 1101 is connected between a first power source VS1 and the first group of the stator windings S11-S1N. The first power converter group 1101 comprises a plurality of power converters 1111-111N as shown in FIG. 1. Likewise, an Mth power converter group 110M is connected between an Mth power source VSM and the Mth group of the stator windings SM1-SMN. The Mth power converter group 110M comprises a plurality of power converters 11M1-11MN as shown in FIG. 1. In some embodiments, the plurality of power converters is divided into a plurality of power converter groups sequentially. In some embodiments, the power converters shown in FIG. 1 are implemented as inverters (e.g., H-bridge inverters).

In some embodiments, the power sources VS1-VSM are separate power sources as shown in FIG. 1. In alternative embodiments, the power sources VS1-VSM may be connected in series to accommodate a high input voltage applied to the reconfigurable motor system 100. Furthermore, the power sources VS1-VSM may be developed from capacitors connected in series and coupled to a common power source. Thus, it may be important to achieve a charge balance among the power sources. In order to accomplish a charge balance of the power sources connected in series, it is desirable that the dc currents flowing in/out of the power sources are equal or approximately equal (e.g., within 20% tolerance) to each other in steady state operation.

In some embodiments, the power sources can perform efficiently and reliably when the current flowing through each power source is a dc current or a current having low low-frequency components. For example, the harmonic components (especially lower order harmonics)) of the current should be reduced down to the minimum. In some embodiments, each winding group should have at least three stator windings. Within a winding group, all windings ideally conduct currents with the same amplitude and frequency, and the phase angles of the winding currents are evenly distributed. As a result, the windings in each winding group form a symmetrical and balanced multi-phase system, and the average current flowing through each power source is a dc current in ideal operation.

The inverter can be controlled by a field-oriented control (FOC) method with harmonic injection. Conventionally, the FOC method for a poly-phase motor is the same as that used in a three-phase motor drive system. The harmonic injection is usually applied to the references of phase voltages. In the steady state operation, the motor drive system with the conventional FOC method is able to transfer energy at the fundamental frequency. The energy cannot be transferred under other high-order harmonics, and thus it is hard to further improve the efficiency of the motor drive system with the conventional FOC method.

Conventionally, a three-phase motor can be modeled in a synchronous d-q frame. In particular, the synchronous d-q frame rotates at the synchronous speed of the motor. Similarly, a poly-phase motor may be modeled in multiple synchronous d-q planes orthogonal to each other. Each of the multiple synchronous d-q planes may correspond to currents and voltages at a harmonic frequency relative to the fundamental voltage and/or current. Each of the multiple synchronous d-q planes represents an independent harmonic plane on which a voltage or current vector, or the magnetic field defined by them, rotates at a synchronous speed determined by the harmonic order and the number of poles of the corresponding harmonic magnetic field in the motor.

In some motors such as a dynamically reconfigurable (DR) induction motor, the number of poles in a harmonic plane can be configured to be proportional to the order of the harmonic, and thus all harmonic planes have the same synchronous speed. These harmonic planes can be controlled to rotate in the same direction as the fundamental synchronous planes.

The DR induction motor can be designed to generate torque and transfer power efficiently on all or at least some of these synchronous harmonic planes. Generally, some harmonic planes can be treated independently from each other. In addition, the harmonic planes can be configured to transfer energy and generate mechanical torque independently.

It should be noted that not all independent harmonic planes are active at any given time. For example, in a nine-phase or a nine-winding motor, the fundamental (the first), the third, the fifth and the seventh harmonic planes may be independently controlled, but not all of these harmonic planes are controlled to generate toque at the same time.

It should further be noted that the choice of the harmonic sets may not be unique. For example, in alternative embodiments, the fundamental (the first), the second, the third and the fifth harmonic planes may be independently controlled. Some or all these harmonic planes can be used to generate power and torque. Alternatively, the harmonic planes may be controlled to get better waveform quality of the currents. For example, by setting the second harmonic current reference, the third harmonic current reference and the fifth harmonic current reference to zero, the waveform quality of the motor currents can be improved. Furthermore, in a DR motor with nine windings (nine phases), fundamental frequency currents, third-harmonic frequency currents, and fifth-harmonic currents (modeled in respective harmonic d-q frames) can generate a rotating magnetic field in the same direction and at the same speed. Therefore, these harmonics, individually or in combination, can be controlled to transfer energy and generate a torque output simultaneously.

At any given time, one or more harmonic planes chosen to transfer power and generate torque are called active harmonic planes. Throughout the description, these active harmonic planes may be alternatively referred as active planes. The current references in other independent harmonic planes (inactive harmonic planes) can be set to zero to reduce the harmonic power losses in the motor and/or the inverter. Alternatively, the inactive planes can be left uncontrolled. In different operation conditions, the selection of the active harmonic planes may change accordingly to improve the operation of the motor, the inverter and/or the system.

Figure 2:
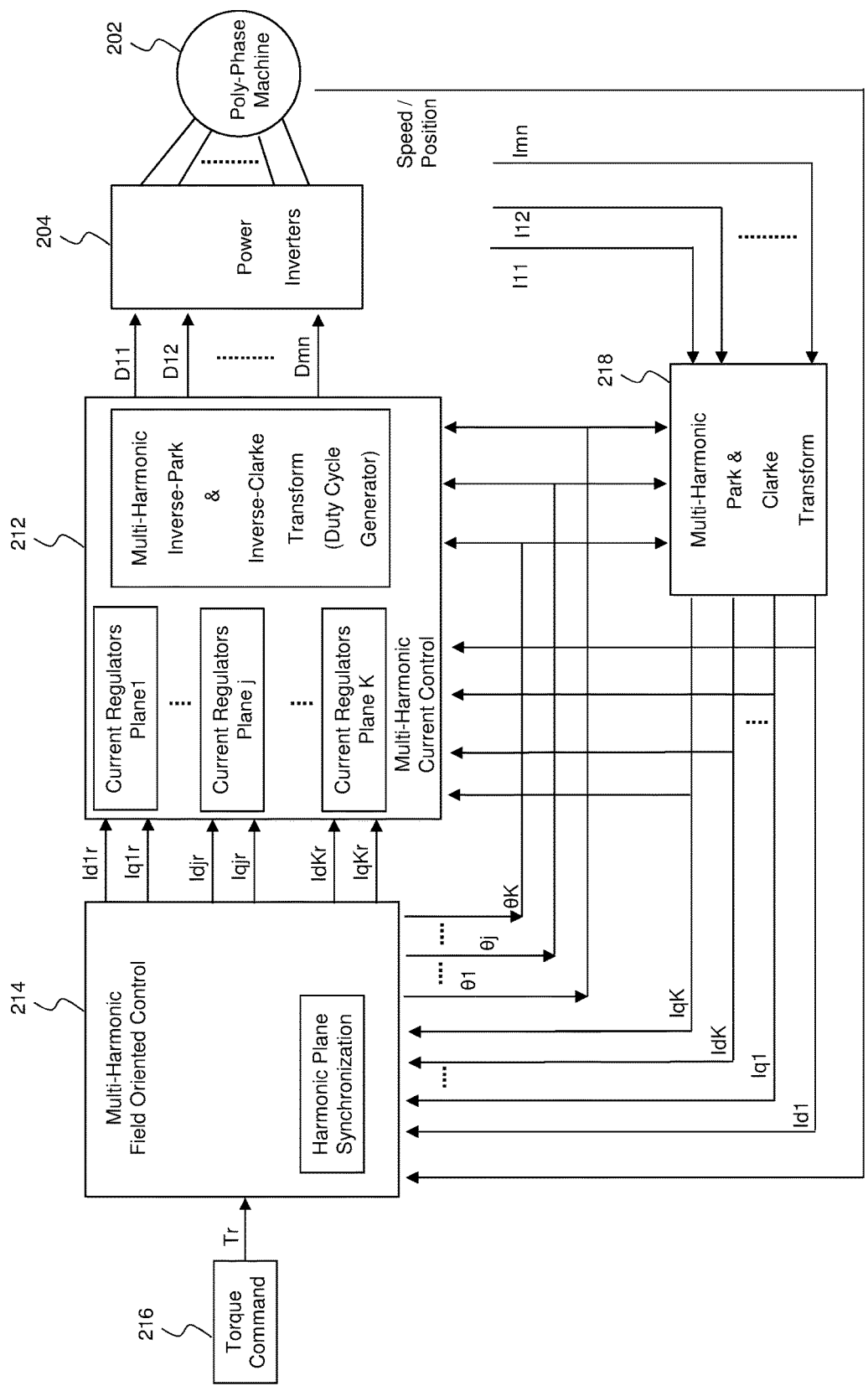
FIG. 2 illustrates a block diagram of a motor system controlled by a multi harmonic FOC method in accordance with various embodiments of the present disclosure.

To fully utilize the potential of such a system, it is advantageous to implement a multi harmonic FOC method at multiple harmonics. FIG. 2 illustrates a block diagram of a motor system controlled by a multi harmonic FOC method in accordance with various embodiments of the present disclosure. The motor system comprises a poly-phase machine 202 and a plurality of inverters 204 configured to drive the poly-phase machine 202. In some embodiments, the poly-phase machine 202 may be implemented as a dynamically reconfigurable (DR) induction motor.

The controller of the motor system comprises a multi-harmonic current control block 212, a multi-harmonic field oriented control block 214, a toque command block 216 and a multi-harmonic Park and Clarke transform block 218. As shown in FIG. 2, the multi-harmonic current control block 212 comprises a plurality of current regulators (e.g., regulators on plane 1, plane j and plane K shown in FIG. 2). The multi-harmonic current control block 212 further comprises a duty cycle generator. The duty cycle generator may comprise a multi-harmonic inverse-Park and inverse-Clarke transform block.

The multi-harmonic Park and Clarke transform block 218 is configured to receive the detected phase currents $I_{11}$ through $I_{mn}$ as shown in FIG. 2. The multi-harmonic Park and Clarke transform block 218 converts the phase currents into variables in multiple orthogonal synchronous frames. More particularly, multi-harmonic Park and Clarke transform block 218 converts the phase currents into their corresponding d-q frame variables through a suitable coordinate transformation method such as Park and Clarke matrixes at different harmonic frequencies. The coordinate transformation method is well-known in the art, and hence is not discussed herein.

The multi-harmonic Park and Clarke transform block 218 is configured to generate current feedback signals including fundamental components $Id1$, $Iq1$, through Kth-order harmonic components $IdK$, $IqK$. K is the number of independent harmonic planes of the system. The multi-harmonic Park and Clarke transformation method is a coordinate transformation mechanism to change ac waveforms such as the phase currents to dc values in corresponding d-q frames on various harmonic planes.

The phase currents have various harmonic contents. The multi-harmonic Park and Clarke transformation matrix contains trigonometric functions at each interested harmonic frequency. The initial phase angles for various harmonic frequencies can be used to set the relative position of a variable such as a harmonic component of the air gap flux at the respective frequency.

It should be noted that assuming a balanced poly-phase system, harmonic components at a certain harmonic frequency in the phase currents (or voltages) are transformed into dc values in the d-q frame on the corresponding harmonic plane with the same harmonic order, and into zero in the d-q frames in other harmonic planes. In other words, the multi-harmonic transformation is a filter which removes other harmonic components but converts the selected harmonic currents or voltages into dc values in the d-q frame on the harmonic plane with the same harmonic order. For example, in a balanced nine-phase system, there are four independent harmonic planes. In some embodiments, the first-order (fundamental), the second-order, the third-order and the fifth-order harmonic planes are selected as active planes. By applying the multi-harmonic coordinate transformation, the fundamental component of the phase currents can be converted into a constant d-axis component and a constant q-axis component in the fundamental harmonic plane. The contribution of the fundamental components to the d-q variables in the second-order, the third-order and the fifth-order harmonic planes is zero. Similarly, the third-order harmonic components in the phase currents can be converted into a constant d-axis component and a constant q-axis component in the third-order harmonic plane. The contribution of the third-order harmonic components to the d-q variables in the fundamental, the second-order, and the fifth-order harmonics is zero. In such a system, the current components on each independent harmonic plane can be controlled independently from the currents on the other harmonic planes. It should be noted that there is a system constraint that the rotor of the motor is common to all harmonic planes. The rotor can couple the harmonic planes together, thereby making the control intermingled and complex.

A harmonic plane synchronization mechanism is used to help separate or synchronize the dynamics among different harmonic planes. In induction machines, the slip is used for such purpose in the multi-harmonic FOC. In the description below, the harmonic plane synchronization is alternatively referred to as slip synchronization. It should be noted that other types of synchronization between the harmonic planes may also be used, especially for non-induction type motors or generators.

As shown in FIG. 2, the fundamental components Id1, Iq1, through the Kth-order harmonic components IdK, IqK are fed into the multi-harmonic field oriented control block 214 for achieving field-oriented control. The control block 214 outputs current references in various harmonic planes, denoted as the fundamental components Id1r, Iq1r on the fundamental plane, through the harmonic components IdKr, IqKr on the Kth harmonic plane, and electrical angle references θ1 through θK for the various harmonic planes. Furthermore, these angle output variables are fed into the multi-harmonic current control block 212 for generating duty cycle signals used for controlling the plurality of inverters 204.

As shown in FIG. 2, the multi-harmonic field oriented control block 214 is configured to receive a torque command signal Tr from the torque command block 216. The torque reference input represents a system output. The system output may be the power of the motor or suitable parameters. The torque reference input may be from a torque command. Alternatively, the torque reference input may be from an output of a speed regulator or a position regulator in the control system. A change in torque reference not only causes the current references to change, it may also cause the slip and thus the electric angle in each active harmonic plane to change.

An important aspect in conventional FOC control of induction motors is to calculate slip or slip frequency using current and/or flux information. In the multi-harmonic field oriented control of induction motors, the slip Sj in each harmonic plane is supposed to be a function of Idj and Iqj, and may be also related to other motor parameters. Because the slip for an active harmonic plane has to be the same as the actual slip of the motor to generate the torque at that plane, and keep the slip in all active harmonic planes approximately the same, it is necessary that synergic changes of magnetizing and torque components can be established in each harmonic plane, i.e. Idjr and Iqjr can change in synchronization through a determined relationship. In steady state or slow-change operation modes, flux linkage in a harmonic plane can be considered to be proportional to the magnetizing component of the current. The slip can be simplified as:

$$S = Ksj \times Iqj / Idj \qquad (1)$$

In Equation (1), j denotes the jth harmonic. Ksj is a constant in the jth harmonic plane determined mainly by motor parameters, especially rotor electromagnetic time constant. S is a constant at a given time, but S can change over time. For example, S may change in response to an operating condition change. S can be decided in consideration with the overall operation of the system. Ksj may change in accordance to various operation parameters as well, such as required torque, speed, the dc link voltage, and currents in various harmonic planes. In a practical application, although mechanical torque can be generated by current components at multiple harmonic frequencies corresponding to multiple harmonic planes, one harmonic frequency may generate more torque. This harmonic frequency can be treated as a dominant frequency, and the harmonic plane at this frequency can be treated as a dominant harmonic plane (the actual frequencies in the currents of a motor depend on the speed of the motor). To simplify the control, S can be decided by the operating variables in the dominant harmonic plane (with the dominant plane controlled with system requirements such as torque/speed demands and efficiency optimization). If necessary, other factors such as magnetic saturation, dc link voltage utilization, power losses and the like can also be considered in this process. A slip synchronization block can be used to make the slip the same for different harmonics. The slip synchronization block is used to establish the relationship between Idjr and Iqjr or Iqj. The basic form of the steady state slip calculation in the FOC may be simplified as:

$$S = Ksj \times IQj / IDj \qquad (2)$$

In Equation (2), Ksj is a constant corresponding to various motor parameters, IQj and IDj may be the actual d-axis current and q-axis currents, the current references or any combination thereof in the d-q frame of the jth harmonic plane. IDj is related to the flux linkage in the jth harmonic plane. IDj can also be replaced by a variable representing the flux linkage in the calculation. One important aspect is that, through Equation (2), the current references may be calculated for the ith harmonic plane from known variables.

Different choices of the parameters in the slip calculation may be used to fulfil different performance objectives or optimization emphasis. It should be noted that Ksj may have different values in different harmonic planes. If the dominant harmonic plane is denoted as the "Nth" plain, then the relationship between the currents in other harmonic planes can be simplified as:

$$Ksj \times IQj / IDj = KsN \times IQN / IDN \quad (3)$$

In essence, the slip synchronization makes the torque component approximately proportionally to the magnetic field strength or the magnetizing current in each harmonic plane. As such, the dynamics between different harmonic planes is better synchronized.

It should be noted that the slip synchronization block may be a physically independent block. Alternatively, the slip synchronization block may not be a physically independent block. For example, the slip synchronization block may be integrated with other control features in software coding or hardware implementation.

With the slip or slip frequency controlled to be a right value, the electrical angles θ1 through θK shown in FIG. 2 can be calculated and fed into the multi-harmonic Park and Clarke transform block 218 to convert the phase currents and/or voltages into the d-q components in various harmonic planes. Furthermore, as shown in FIG. 2, the electrical angles θ1 through θK can be fed into the multi-harmonic current control block 212 to convert the d-q components back to phase parameters (e.g., duty cycles for each phase switches to control the power switches in the inverter) through using the inverse Park and Clark transformation.

The total torque of the motor is the sum of torques generated by all harmonics in all active harmonic planes. The total torque can be calculated as:

$$T = \sum Tj \quad (4)$$

In Equation (4), Tj is the mechanical torque generated by the jth harmonic plane. In steady state, Tj is proportional to the flux linkage and torque component of the current in the jth harmonic plane. In an induction machine, the steady-state torque can be expressed as:

$$Tj = Ktj \times Idj \times Iqj \quad (5)$$

In Equation (5), Ktj is a torque coefficient determined by various motor parameters. Ktj may be related to Ksj. Idj is the d-axis current (usually representing the magnetizing component) for the jth harmonic. Iqj is the q-axis current (usually representing the torque component) for the jth harmonic. In transients, similar to a corresponding flux linkage, Tj is also subject to an inertia defined by the rotor electromagnetic time constant $\tau r$. In fast transients, the torque generated by the motor has to consider the inertia defined by the rotor electromagnetic time constant $\tau r$, and thus current references need to be modified so as to reflect the electromagnetic inertia. Modifying the current references will be discussed in detail below with respect to the pole number change control.

In the multi-harmonic field oriented control block 214, the field-oriented control may be implemented for the fundamental frequency and other harmonic frequencies. For example, the multi-harmonic field oriented control block 214 may consider the fundamental frequency components and generate the fundamental current references Id1r and Iq1r. Furthermore, the multi-harmonic field oriented control block 214 may consider the harmonic frequency components and generate the jth harmonic plane current references Idjr and Iqjr, and the Kth harmonic plane current references IdKr and IqKr. Id1r, Iq1r, Idjr, Iqjr, IdKr and IqKr are fed into the multi-harmonic current control block 212 as shown in FIG. 2.

As shown in FIG. 2, the multi-harmonic current control block 212 is configured to generate duty cycles $D_{11}$-$D_{mn}$. As shown in FIG. 2, the multi-harmonic current control block 212 comprises a plurality of current regulators and a duty cycle generator. The duty cycle generator comprises a multi-harmonic inverse-Park and inverse-Clarke transform block. The multi-harmonic current control block 212 is configured to receive the reference current signals from multi-harmonic field oriented control block 214 and the detected motor currents from the multi-harmonic Park and Clarke transform block 218. Based on these signals, the multi-harmonic inverse-Park and inverse-Clarke transform block determines the duty cycles $D_{11}$-$D_{mn}$ accordingly.

The multi-harmonic FOC may be configured so that it can be used in different operating conditions. Some details will be described in detail below with respect to FIGS. 3-14.

Figure 3:
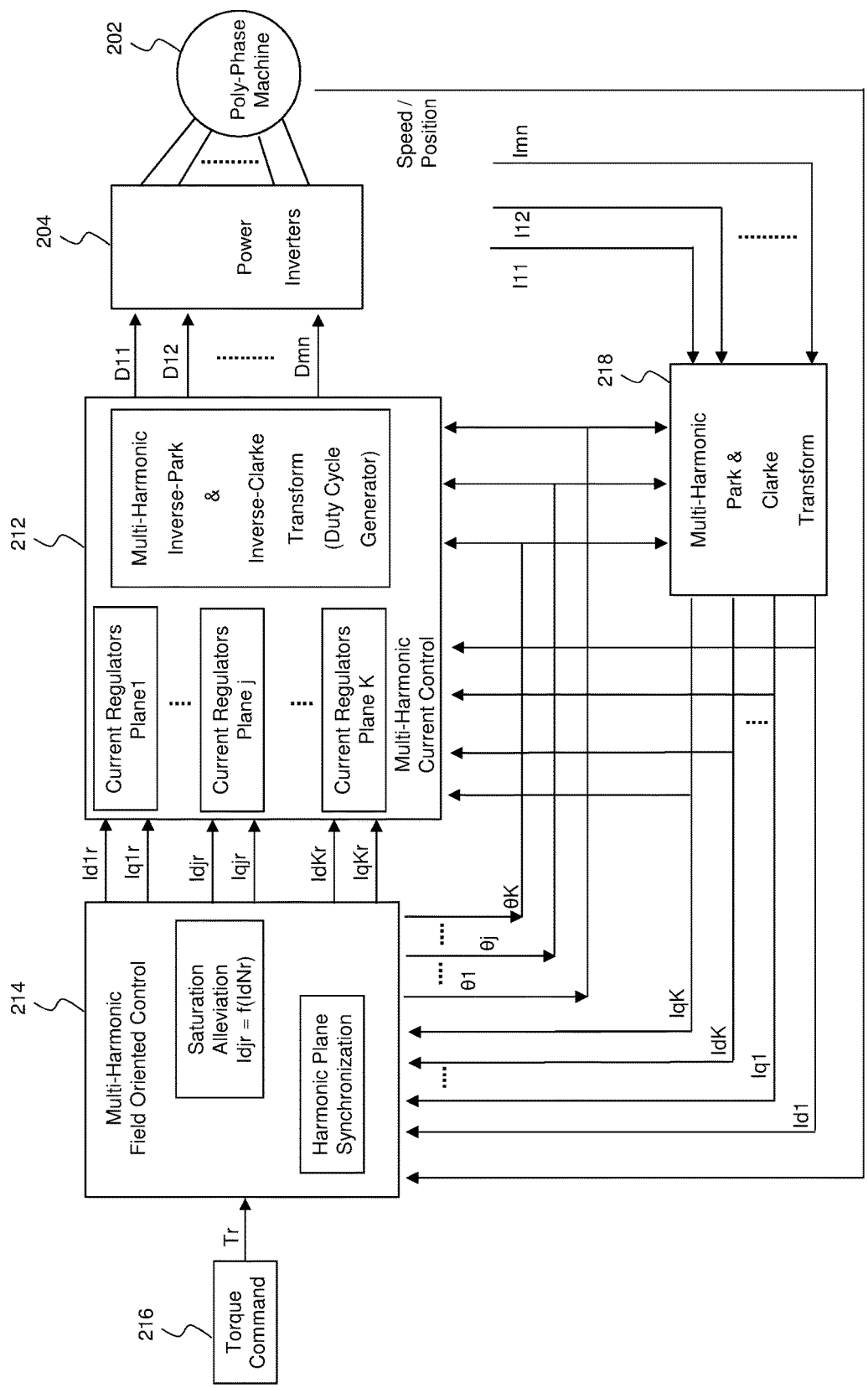
FIG. 3 illustrates a block diagram of a motor system controlled by a multi harmonic FOC method including a saturation alleviation feature in accordance with various embodiments of the present disclosure.

FIG. 3 illustrates a block diagram of a motor system controlled by a multi harmonic FOC method including a saturation alleviation feature in accordance with various embodiments of the present disclosure. The block diagram of FIG. 3 is similar to that of FIG. 2 except that a saturation alleviation block is included to avoid or alleviate magnetic saturation in the motor/generator.

As the magnetic material in a motor has a limited saturation point, to avoid saturation, or to increase the power/torque capability under the saturation limit, it is desirable to inject harmonic currents into the magnetizing components of the winding currents. In some embodiments, the third harmonic, and sometimes the fifth harmonic, the seventh harmonic or even higher order harmonic components with the right amplitudes can be used. According to the FOC method, when a magnetizing component at a harmonic frequency is used, it is better to add a corresponding torque component to the currents at the same harmonic frequency to produce a torque in the same direction as the fundamental frequency. However, the position of the harmonic frequency flux, which may be controlled through the relative phase of the harmonic currents, can be adjusted to reduce the magnetic saturation level in various parts of the motor, such as the tooth areas or the yoke areas. In this mode, the dominant harmonics plane (represented by "N") is selected as the fundamental harmonic plane, and the magnetizing component reference Idjr in other (mainly the third order) harmonic planes are determined as a right proportion of IdNr (reference of IdN) by a saturation alleviation block as shown in FIG. 3.

It should be noted that the saturation alleviation block may be a physically independent block. Alternatively, the saturation alleviation block may not be a physically independent block. For example, the saturation alleviation block may be integrated with other control features in software coding or hardware implementation.

Figure 4:
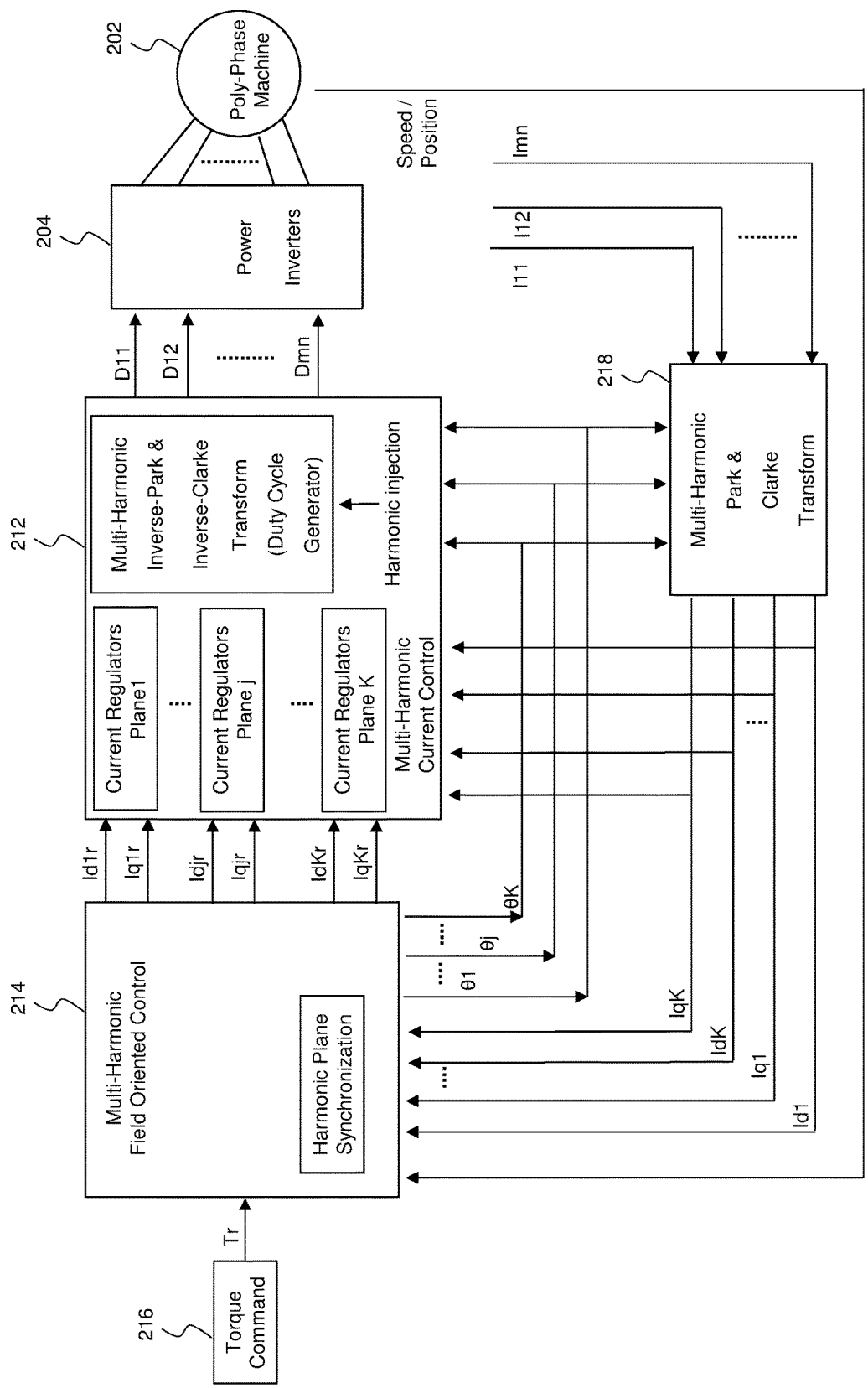
FIG. 4 illustrates a block diagram of a motor system controlled by a combination of a multi harmonic FOC method and a harmonic injection method in accordance with various embodiments of the present disclosure.

FIG. 4 illustrates a block diagram of a motor system controlled by a combination of a multi harmonic FOC method and a harmonic injection method in accordance with various embodiments of the present disclosure. The block diagram of FIG. 4 is similar to that of FIG. 2 except that the harmonic injection method is employed to further improve the performance of the motor system.

To increase the torque/power output or efficiency, the harmonic components may be injected into the motor control. When the inverter connected to the motor windings approaches its output voltage limit, the fundamental component of the motor winding voltage can be increased if a harmonic such as the third harmonic component is added. When the voltage outputs are close to the limit, and motor currents start to lose control, and the voltage shape can be changed to a trapezoid shape. The flat portion of the voltage may be generated by a PWM control with the maximum duty cycle allowed, or by keeping the corresponding switch to remain in an on state during the corresponding time. In this operation mode, the motor currents include components at various harmonic frequencies. Through the multi-harmonic d-q transformation, the d-q components of the winding currents can be obtained. The d-components (e.g., the magnetizing component at various harmonic frequencies) can be used in the FOC (e.g., making Sj proportional to torque requirements) to calculate the corresponding q-component references. As motor currents may not be fully controlled, the slip may be decided using parameters in the dominant harmonic plane only. This makes the multi-harmonic FOC behave like a slip-frequency control mechanism for multi harmonics. In this mode of operation, the system adds harmonic components to the voltage of windings through harmonics in the duty cycles of the switches in the PWM generators, and detects the existence of harmonic currents, and intentionally adjusts the torque components in various harmonic planes when currents are controllable. As shown in FIG. 4, harmonics are injected into the respective duty cycles.

Figure 5:
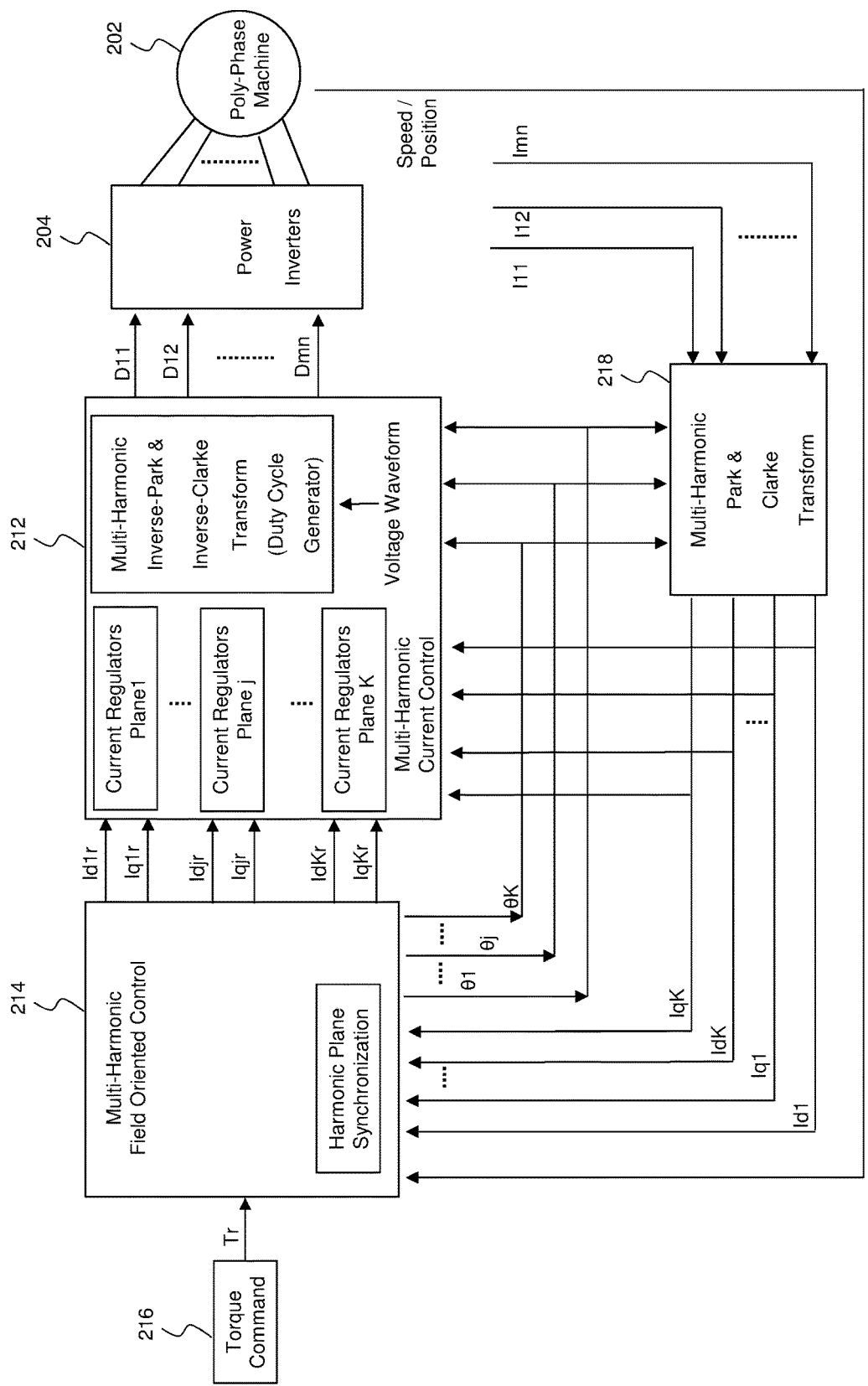
FIG. 5 illustrates a block diagram of a motor system controlled by a multi harmonic FOC method using a voltage waveform as a control variable in accordance with various embodiments of the present disclosure.

FIG. 5 illustrates a block diagram of a motor system controlled by a multi harmonic FOC method using a voltage waveform as a control variable in accordance with various embodiments of the present disclosure. The block diagram of FIG. 5 is similar to that of FIG. 4 except that desired voltage waveforms are used to control the motor system.

In operation, the slip can be adjusted according to the dominant harmonic currents using desired voltage waveforms (e.g., a trapezoidal or rectangular shape) in the PWM modulator when currents are not controllable. As shown in FIG. 5, the desired voltage waveforms are added into the multi-harmonic inverse-Park and inverse-Clarke transform block to adjust the slip.

It should be noted that the saturation alleviation function shown in FIG. 3 may also be used in combination with the control method described above with respect to FIG. 5.

Figure 6:
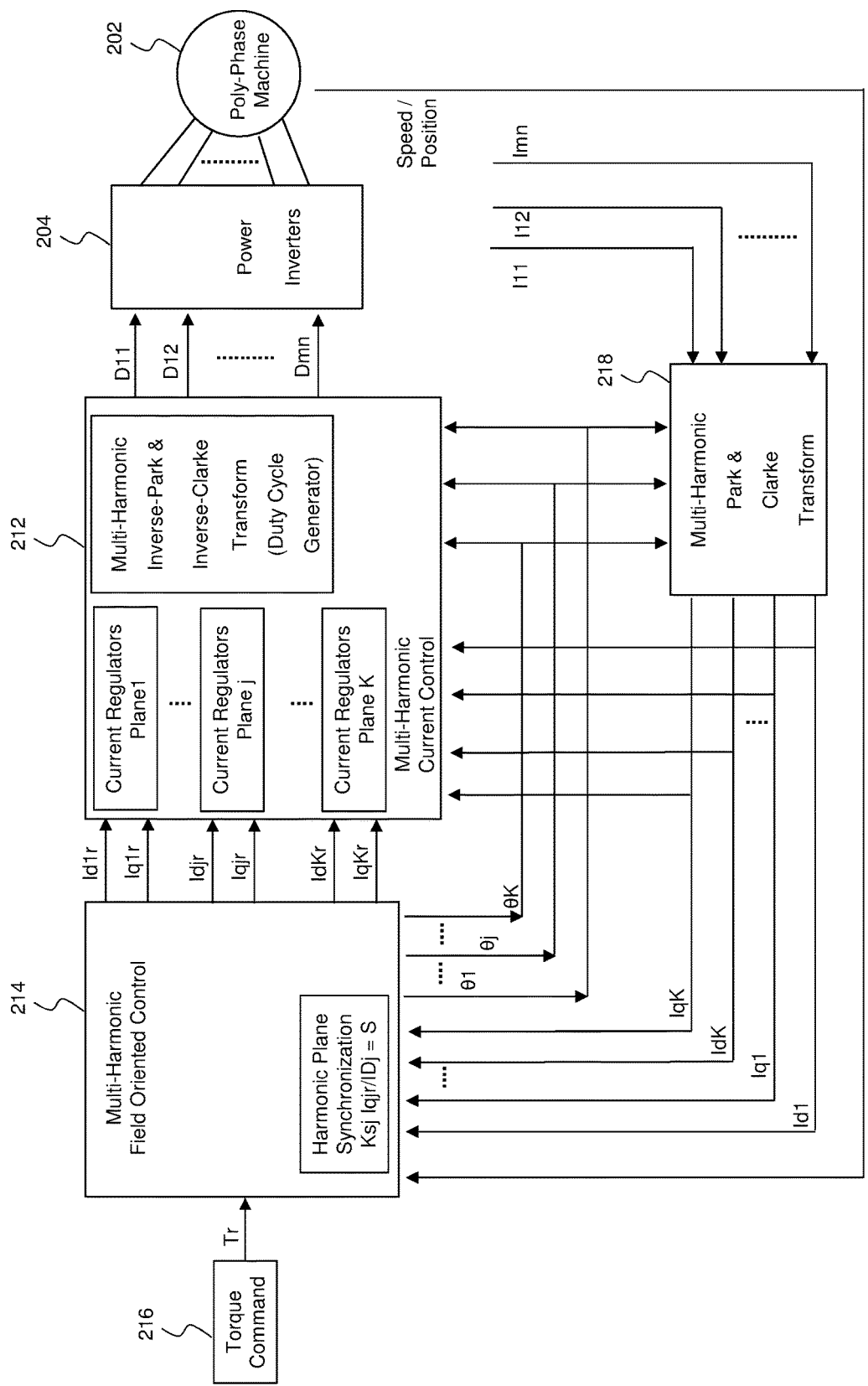
FIG. 6 illustrates a block diagram of a motor system controlled by another multi harmonic FOC method in accordance with various embodiments of the present disclosure.

FIG. 6 illustrates a block diagram of a motor system controlled by another multi harmonic FOC method in accordance with various embodiments of the present disclosure. The block diagram of FIG. 6 is similar to that of FIG. 2 except that slip in different harmonic planes are approximately the same.

The FOC method shown in FIG. 6 is used to get torque output from multiple existing harmonic frequencies at the same time. Obtaining the total torque from different frequencies at the same time may be advantageous due to many factors. There are always some non-linear effects in a motor. For example, due to the nonlinear magnetic performance of the motor, the motor currents always have some harmonic components. When there is a harmonic component in the magnetizing components, either intentionally or due to non-linearity, a proportional torque component for the same harmonic frequency can be added according to the slip synchronization principle, as long as such harmonic plane is controllable. In this way, the motor's mechanical output and efficiency can be both improved. In this mode of operation, the system detects the existence of harmonic currents, intentionally adjusts the torque components in various harmonic planes to produce torque. In the slip calculation, more emphasis should be focused on the detected magnetizing currents or magnetic linkages, less on the references for such variables.

It should be noted that the method above may be used in induction motors, where the magnetic field is generated by winding currents. Alternatively, this method may be used in other motors where the magnetic field is not only controlled by winding currents, such as permanent magnet motors, where the magnetic field is also shaped by the presence and the shape of magnets, or switching/synchronous reluctance motors, where the magnetic is also affected by the shape of other magnetic parts, and any combination thereof. In these machines, the winding currents may be controlled in response to the strength of magnetic field which naturally has harmonic contents, and the magnetic field strength can be measured directly, or indirectly through a voltage or current in a plurality of coils, or calculated/estimated from design. This can be considered as a way to optimize the winding current waveforms in different operating conditions to improve the torque or power output, or optimize the power loss or efficiency.

It should be noted that the saturation alleviation function shown in FIG. 3 may also be used in combination with the control method described above with respect to FIG. 6.

Figure 7:
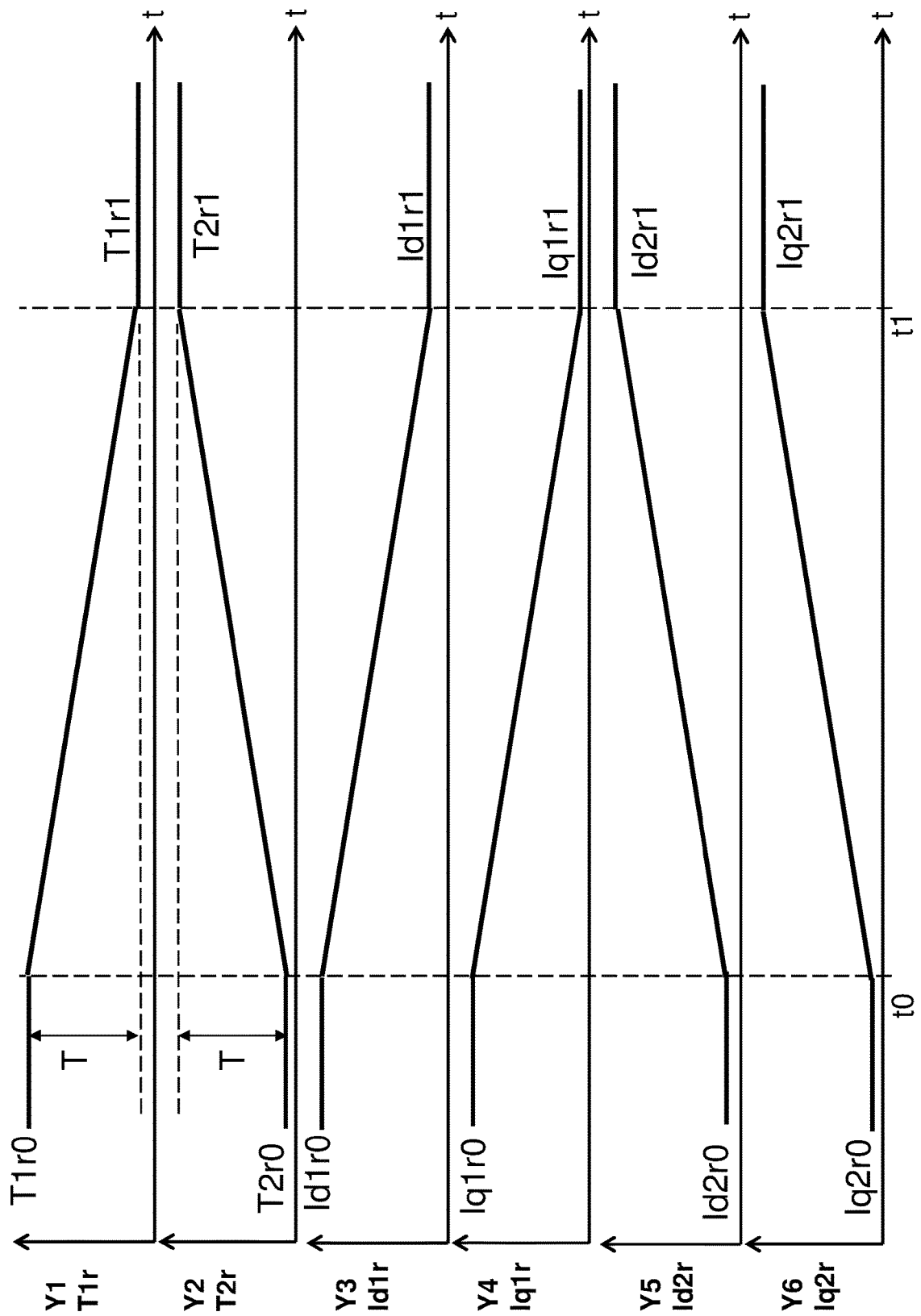
FIG. 7 shows some exemplary waveforms of a first implementation of a torque reference change control scheme in accordance with various embodiments of the present disclosure.

FIG. 7 shows some exemplary waveforms of a first implementation of a torque transition control scheme in accordance with various embodiments of the present disclosure. The horizontal axis of FIG. 7 represents intervals of time. There may be six vertical axes. The first vertical axis Y1 represents the reference torque of a first harmonic plane. The second vertical axis Y2 represents the reference torque of a second harmonic plane. The third vertical axis Y3 represents the Id current reference of the first harmonic plane. The fourth vertical axis Y4 represents the Iq current reference of the first harmonic plane. The fifth vertical axis Y5 represents the Id current reference of the second harmonic plane. The sixth vertical axis Y6 represents the Iq current reference of the second harmonic plane.

FIG. 7 illustrates a torque reference change control scheme which may be used to accomplish a smooth pole number change. Since the energy transfer and torque generation of the motor can be controlled in multiple harmonic planes, it is also important to control the transfer of the torque and power among different harmonic planes. When the changes in the control variables are relatively small, the changes can be instantaneous. When the torque transferred is significant such as in a pole number change where the torque in a harmonic plane is approximately totally transferred to another harmonic plane, it is desirable to change the torque smoothly to avoid big disturbance and torque interruption in the motor system. FIG. 7 shows a torque reference change process between a first harmonic plane (the outgoing plane) and a second harmonic plane (incoming plane). As shown in FIG. 7, the changes of the torque reference and current references in the two harmonic planes happen gradually and rather smoothly.

It should be noted although linear changes are shown in FIG. 7, non-linear changes are possible, and sometimes desired. Also, although the changes are shown to happen at the same time, the changes may happen with some offset. In other words, the time relationship shown in FIG. 7 is approximate in nature. Especially, in a DR induction motor, the number of poles of the motor is determined by the winding currents, or more precisely by the magnetizing components of the winding currents, and the number of poles generated by a harmonic current is proportional to the order of the harmonic. If the fundamental currents generate a magnetic field with P pairs of poles in the air gap of the motor, then the jth harmonic currents generate a magnetic field with (j×P) pairs of poles in the air gap. The DR motor technology allows a magnetic field with multiple harmonics simultaneously present in a motor, and through controlling the relative ratio of the harmonic currents, the motor performance can be optimized.

Prior to t0, the system is working in a first mode in the first harmonic plane with the torque reference being T. As shown in FIG. 7, Idr1 is not equal to zero. Idr1 establishes a magnetic field in the air gap with P1 pairs of poles. At t0, a pole change process starts to change the pole number from P1 to P2 with the second harmonic plane to be the active or the dominant harmonic plane to provide power and torque. To keep the total torque almost constant to avoid or reduce disturbance to the system, it is desirable to reduce the torque from the first harmonic plane gradually, while increase the torque output from the second harmonic plane gradually as shown in FIG. 7. The references T1$r$ and T2$r$ changes linearly during the pole change process. In alternative embodiments, T1$r$ and T2$r$ can also change nonlinearly, and the shapes of T1$r$ and T2$r$ can be used to optimize some performance parameters. In response to the torque reference change, the current references, Id1$r$ and Iq1$r$ for the first harmonic plane, and Id2$r$ and Iq2$r$ for the second harmonic plane also change.

At t1, which equals T0+Tc, with Tc being the pole change period, T1$r$ reaches 0, and T2$r$ equals to T. The second harmonic plane thus takes over all the output, and the pole number change is completed. The shape of the current references during this period may be different (the linear shape is used as an example to illustrate change, not representing actual waveforms).

Figure 8:
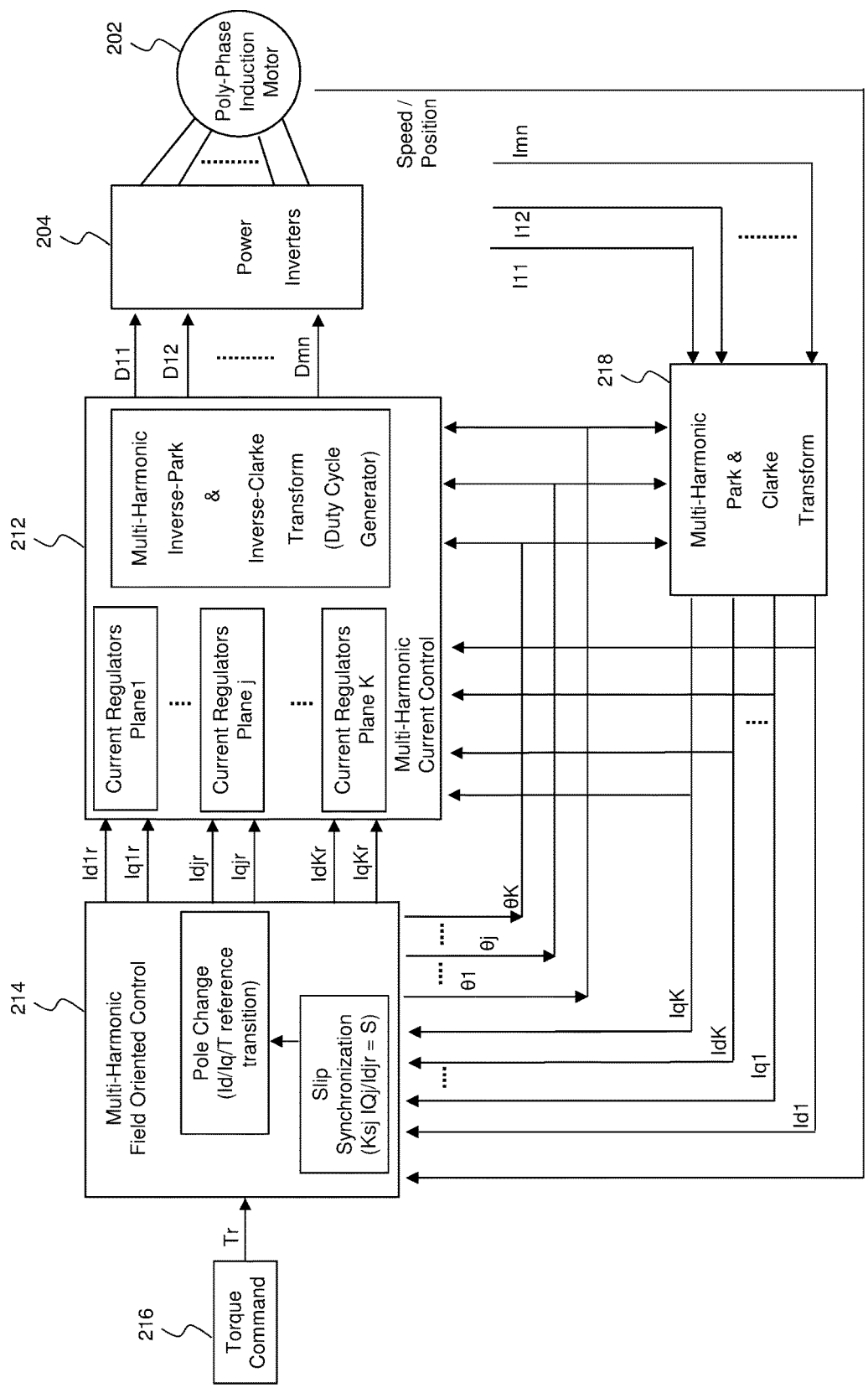
FIG. 8 shows an example FOC control system to implement a pole change process in accordance with various embodiments of the present disclosure.

FIG. 8 shows an example FOC control system to implement a pole change process in accordance with various embodiments of the present disclosure. The pole number change in a DR motor is a special transient process. FIG. 8 illustrates how the multi-harmonic FOC operates in the pole number change transient with a special consideration that the dynamics in different harmonic planes are decoupled through the slip synchronization during the pole number change transient. As a particular example, the pole number change is considered as a change from one operating state with a dominant harmonic plane to another one with a different dominant harmonic plane, and a multi-harmonic FOC is used to control this transition smoothly.

Assuming in the first operating state, the motor is driven by a first dominant harmonic in a first mode with P1 pole pairs, and the motor can be configured to operate in a second mode with second dominant harmonic currents having P2 pole pairs. This pole number change process can be implemented mainly as torque and magnetizing current reference changes among different harmonic planes in multi-harmonic FOC control.

Figure 9:
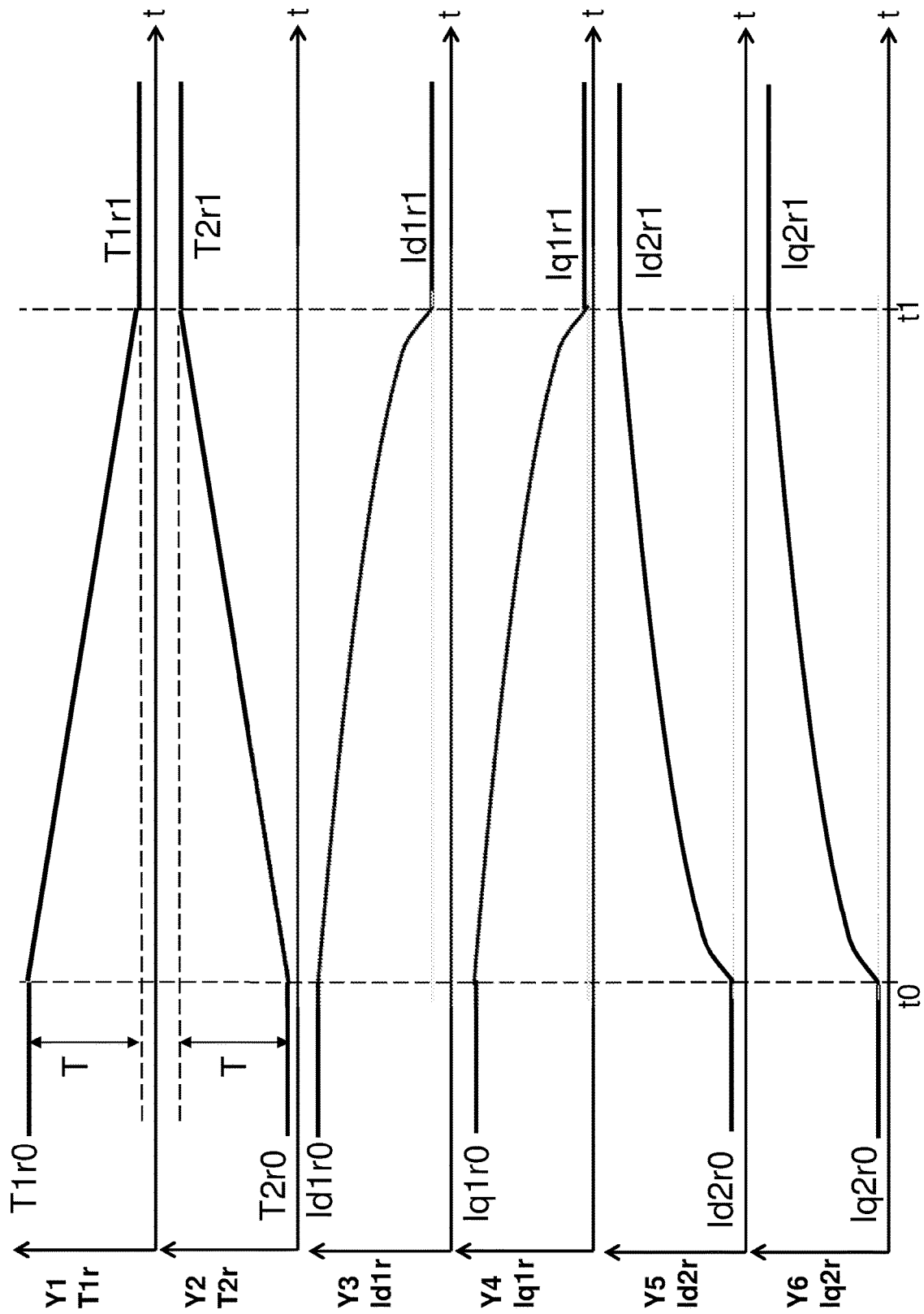
FIG. 9 shows some exemplary waveforms of a second implementation of a torque reference change control scheme in accordance with various embodiments of the present disclosure.

FIG. 9 shows some exemplary waveforms of a second implementation of a torque reference change control scheme in accordance with various embodiments of the present disclosure. The waveforms shown in FIG. 9 are similar to those shown in FIG. 7 except that nonlinear functions are used for non-linear current changes. If the pole change period is much longer than rotor electromagnetic time constant $\tau r$, or the effect of $\tau r$ can be ignored during the transition, the currents including magnetizing component references Id1$r$ and Id2$r$ can be assumed to change relatively slowly, so the inertia caused by $\tau r$ is not significant, and can be ignored.

The current references of Id1$r$ and Iq1$r$ can change proportionally, so the slip S1 calculated in the first harmonic plane and S2 calculated in the 2nd harmonic plane are about the same. There are different ways to change the control references during the transition period, and some examples are listed below.

$$T1r = T\left(1 - \frac{t}{Tc}\right) \tag{6}$$

$$Id1r = Id10 \times sqrt\left(1 - \frac{t}{Tc}\right) \tag{7}$$

$$Iq1r = Iq10 \times sqrt\left(1 - \frac{t}{Tc}\right) \tag{8}$$

$$T2r = T\left(\frac{t}{Tc}\right) \tag{9}$$

$$Id2r = Id21 \times sqrt\left(\frac{t}{Tc}\right) \tag{10}$$

$$Iq2r = Iq21 \times sqrt\left(\frac{t}{Tc}\right) \tag{11}$$

In the equations above, sqrt is the square root function. Id10 is the value of Id1 at T0, and Ig10 is the value of Iq1 at T0, which produce the motor torque T. Id21 and Iq21 are the values of Id2 and Iq2 at T1, which produce the required torque T after the pole number change process finishes. Please note that T may change during the pole number change process if needed. The change of T can cause T1$r$ and T2$r$ to change proportionally, and thus causing Id1$r$, Iq1$r$, Id2$r$ and Iq2$r$ to change accordingly. In this scheme, the current references change nonlinearly, which can be implemented easily with loop-up tables in a microcontroller (MCU). In this solution, all current references change nonlinearly. Different nonlinear functions can be used for nonlinear current changes.

Figure 10:
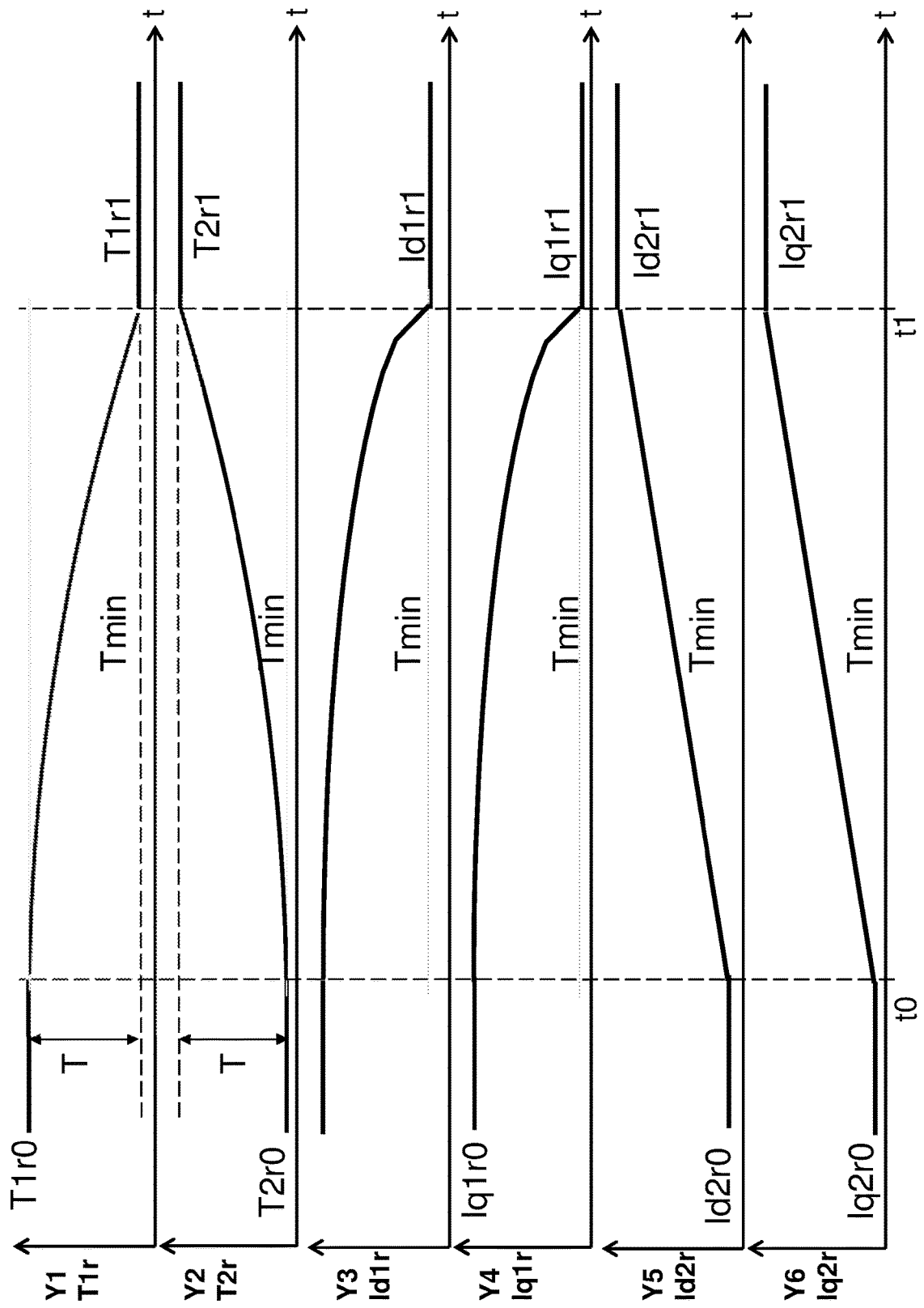
FIG. 10 shows some exemplary waveforms of a third implementation of a torque reference change control scheme in accordance with various embodiments of the present disclosure.

FIG. 10 shows some exemplary waveforms of a third implementation of a torque reference change control scheme in accordance with various embodiments of the present disclosure. The waveforms shown in FIG. 10 are similar to those shown in FIG. 9 except that at least some current references change linearly in the process. The references can be expressed as:

$$T1r = T\left(1 - \left(\frac{t}{Tc}\right)^2\right) \tag{12}$$

$$Id1r = Id10 \times sqrt\left(1 - \left(\frac{t}{Tc}\right)^2\right) \tag{13}$$

$$Iq1r = Iq10 \times sqrt\left(1 - \left(\frac{t}{Tc}\right)^2\right) \tag{14}$$

$$T2r = T\left(\left(\frac{t}{Tc}\right)^2\right) \quad (15)$$

$$Id2r = Id21\left(\frac{t}{Tc}\right) \quad (16)$$

$$Iq2r = Iq21\left(\frac{t}{Tc}\right) \quad (17)$$

As shown in FIG. 10, Id2r and Iq2r change linearly. The linear changes shown in FIG. 10 may simplify the implementation of the FOC method.

Figure 11:
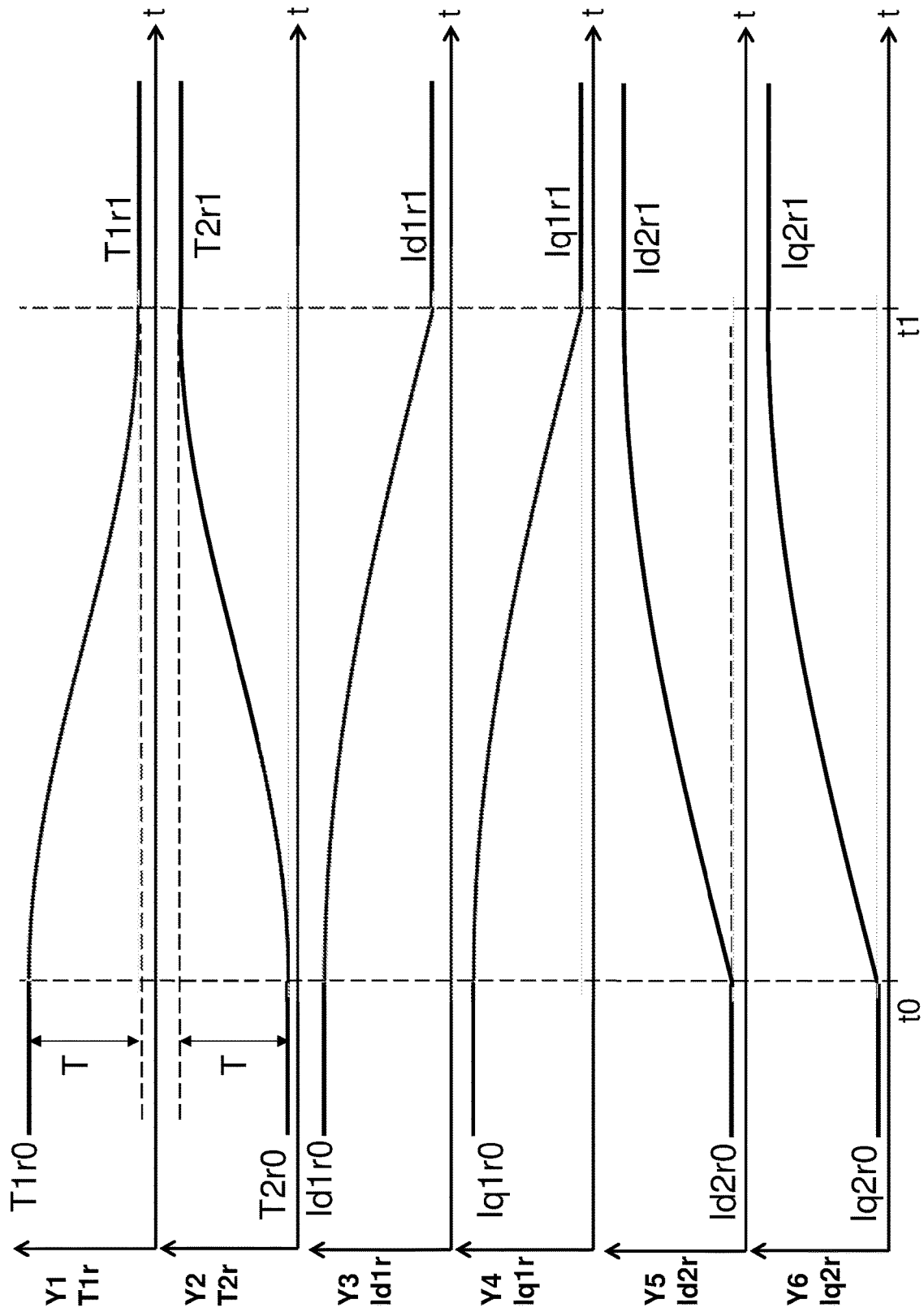
FIG. 11 shows some exemplary waveforms of a fourth implementation of a torque reference change control scheme in accordance with various embodiments of the present disclosure.

FIG. 11 shows some exemplary waveforms of a fourth implementation of a torque reference change control scheme in accordance with various embodiments of the present disclosure. The waveforms shown in FIG. 11 are similar to those shown in FIG. 9 except that current references include trigonometric functions. The references can be expressed as:

$$T1r = T\cos^2\left(\frac{\pi \times t}{2 \times Tc}\right) \quad (18)$$

$$Id1r = Id10 \times \cos\left(\frac{\pi \times t}{2 \times Tc}\right) \quad (19)$$

$$Iq1r = Iq10 \times \cos\left(\frac{\pi \times t}{2 \times Tc}\right) \quad (20)$$

$$T2r = T\sin^2\left(\frac{\pi \times t}{2 \times Tc}\right) \quad (21)$$

$$Id2r = Id21 \times \sin\left(\frac{\pi \times t}{2 \times Tc}\right) \quad (22)$$

$$Iq2r = Id21 \times \sin\left(\frac{\pi \times t}{2 \times Tc}\right) \quad (23)$$

These trigonometric functions may be implemented as look-up tables in an MCU. As shown in FIG. 11, all variables change smoothly. This is beneficial for the performance of the motor. For example, this implementation may improve the efficiency of the motor.

In the three solutions shown in FIGS. 9-11, a set of transition functions are used in each case. The first three functions in each set are descending transition functions which decrease the torque for the ongoing harmonic plane, and the last three functions are ascending transition functions which increase the torque for the incoming harmonic plane. Since the d-component and q-component references change proportionally during the transition, the slip does not change in this process according to the FOC control algorithm.

Figure 12:
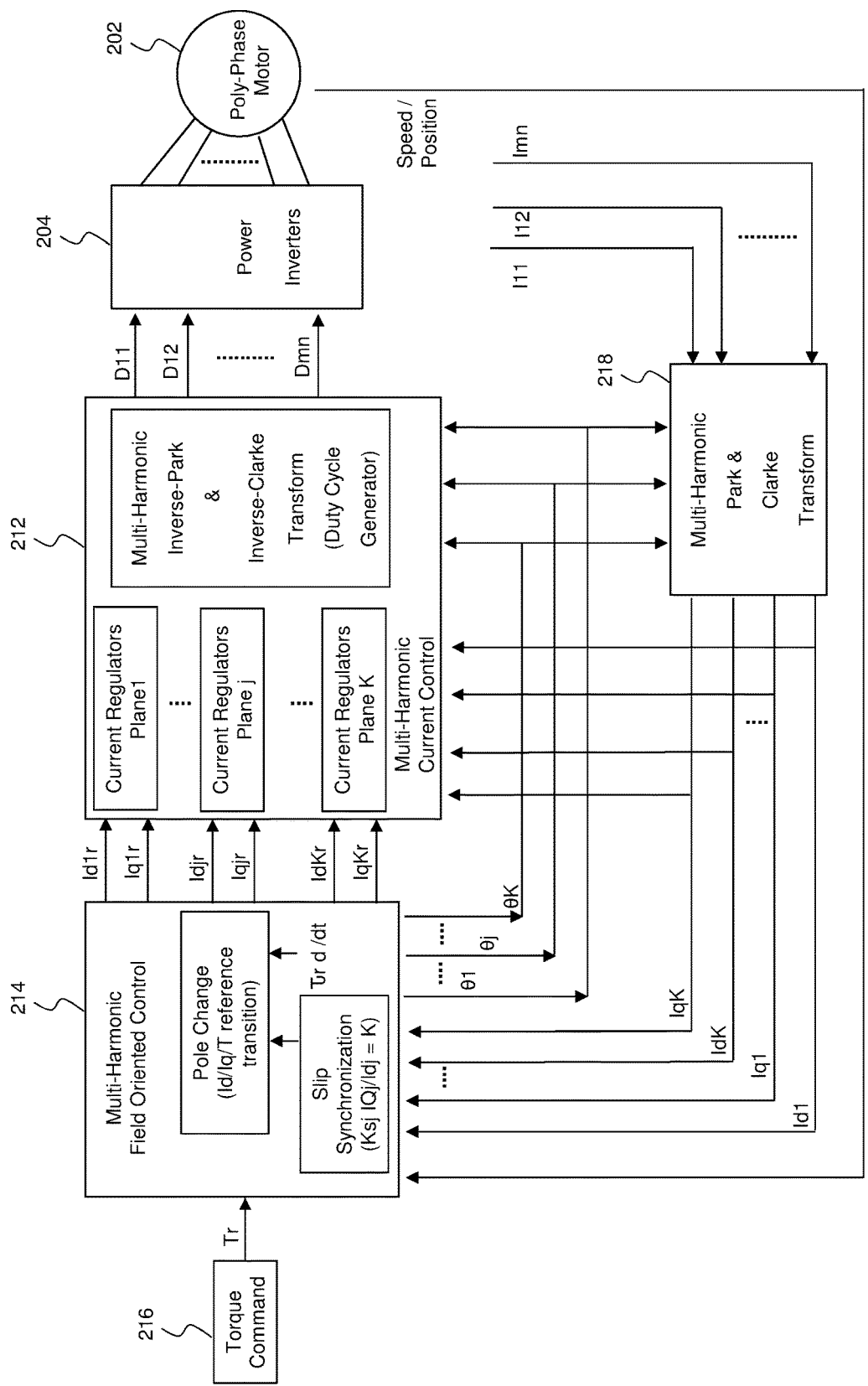
FIG. 12 shows an example FOC control system to implement a fast pole change process in accordance with various embodiments of the present disclosure.

FIG. 12 shows an example FOC control system to implement a fast pole change process in accordance with various embodiments of the present disclosure. The block diagram of FIG. 12 is similar to that shown in FIG. 2 except that a pole change block with a reference modifier block τ rd/dt is added to improve the system performance under a fast transient such as a fast pole change process.

If a transient such as a pole number change process is fast relative to the motor's rotor electromagnetic time constant τ r, and the rotor electromagnetic time constant cannot be ignored, then the dynamics of the motor and the control system become more complex. To make sure that the torque generated in a harmonic plane follows its reference accurately, it is desirable to compensate the effect of the rotor electromagnetic inertia represented by τ r. One way to achieve this is to add a time-derivative term of the desired magnetic linkage (and corresponding magnetizing current Idjr') as a modifier on the active harmonic planes to their corresponding magnetizing component references Idjr. The time-derivative modifier Idjm for the jth harmonic plane can be calculate as:

$$Idjm = \tau_r \times \left(\frac{d(Idjr')}{dt}\right) \quad (24)$$

In Equation (24), Idjr' is the would-be reference for Idj during the pole change transition if the rotor electromagnetic inertia were not present, which may take the form of the equations discussed above with respect to FIGS. 9-11.

In operation, Idjm should be finite on both the outgoing and incoming harmonic planes. This may exclude some otherwise feasible solutions. For example, the solution shown in FIG. 9 and the solution shown in FIG. 10 discussed above may not be applicable to some applications since at some points of time during the transition, the time-derivative of Iq1r or Iq2r is infinite, which, although may be made finite by a limiter resulting in inaccuracy, is not desirable. On the other hand, the solution shown in FIG. 12 is an appropriate choice since the derivatives of the choosing transition functions are finite. There may be other solutions which satisfy this finite derivative requirement. In these example solutions, through synchronizing the current reference changes between d-components and q-components in both incoming harmonic plane in which the magnetic strength and torque are to be increased following the ascending transition functions, and the outgoing harmonic plane in which the magnetic field strength and torque are to be decreased following descending transition functions, the pole change process can transition smoothly from one mode with P1 pairs of poles to another mode with P2 pairs of poles.

One important advantage in these solutions, each with a different set of transition functions, is that the slip in different active harmonic planes are kept approximately the same as the value prior to the transient even during fast transitions. As a result, good system performance during a fast dynamic transient like a fast pole change transition can be kept through the multi-harmonic FOC technology. After the pole number change process finishes, it may be necessary to change the slip to match the changed operating condition. Especially, if the torque requirement has been changed significantly, the slip should be adjusted to match the torque requirement. The slip change again can be implemented in coordination with current reference and torque reference changes in the active harmonic plains simultaneously. The relationship can be expressed as:

$$Tjr = Ktj \times Idj \times Iqj = \left(\frac{Ktj}{Ksj}\right) \times Idjr^2 \times Sj \quad (25)$$

By synchronizing the torque reference with torque-component currents and magnetizing-component current references in all active harmonic planes simultaneously, the slip and slip frequencies in all active harmonic planes can be adjusted accordingly. In this way, a significant torque change such as a complex pole change process can be divided into two steps. The first step is a simple pole change step without adjusting the slip. The second step is a slip adjustment step. It should be noted that depending on different applications and design needs, the slip adjustment step can also be performed before the simple pole change step.

Such pole-change control technique can be expanded to be used in other large transients where a fast magnetic field change is required. For example, it can be used in the efficiency optimization algorithm of induction motors where the magnetizing current needs a large and fast adjustment in response to a big change in the torque demand. The transition equations in solutions shown in FIGS. 9-11 can be used to coordinate large changes in different harmonic planes. A large change can be divided into multiple steps with a slip change step.

Figure 13:
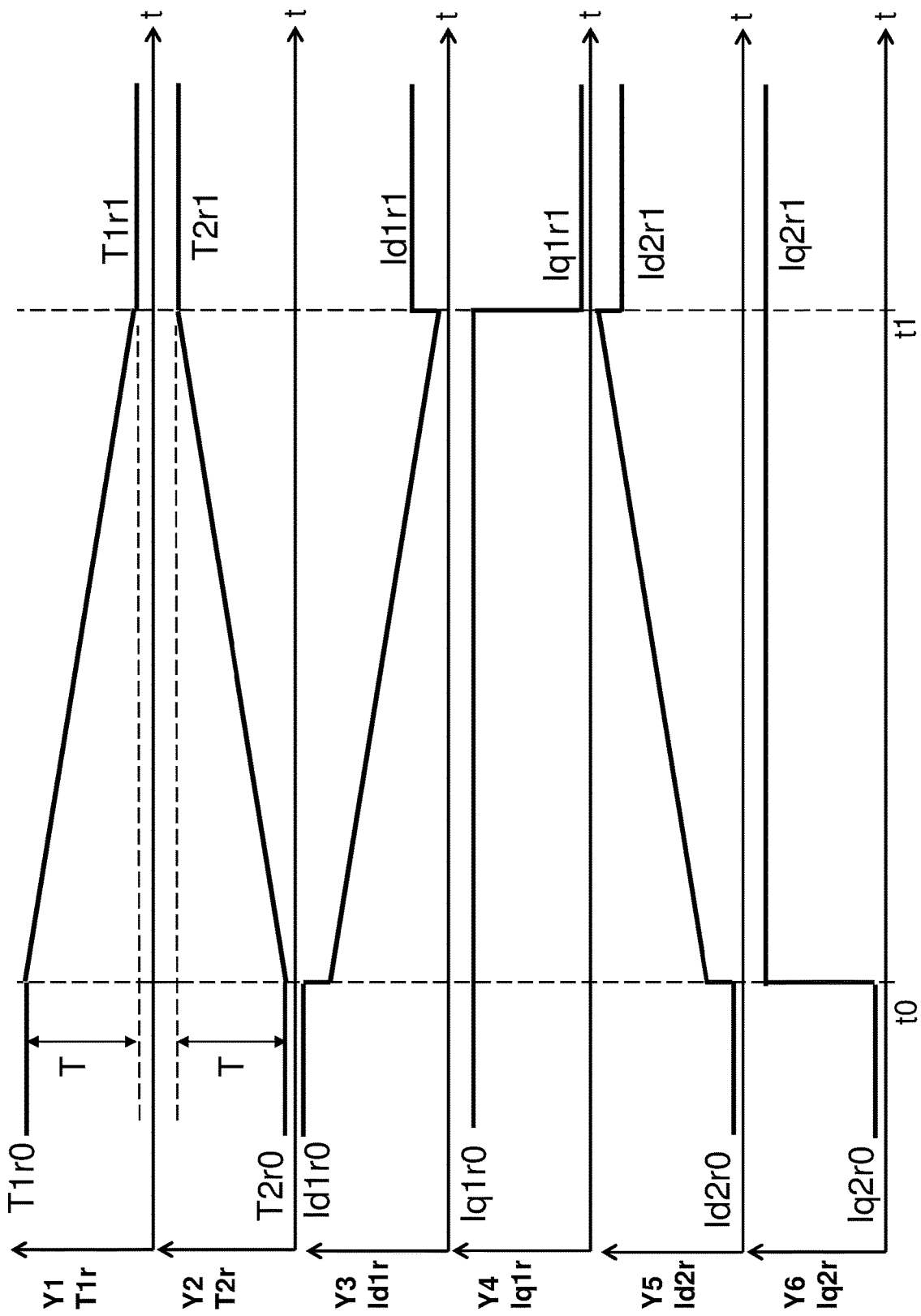
FIG. 13 shows some exemplary waveforms of a fifth implementation of a torque reference change control scheme in accordance with various embodiments of the present disclosure.

FIG. 13 shows some exemplary waveforms of a fifth implementation of a torque reference change control scheme in accordance with various embodiments of the present disclosure. The waveforms shown in FIG. 13 are similar to those shown in FIG. 9 except that during a transition, in a descending harmonic plane where the torque reference decreases, the d-axis current reference decreases gradually while the q-axis current reference is maintained constant until the end of the transition and then changes abruptly, while in an ascending harmonic plane where the torque reference increases, the d-axis current reference increases gradually while the q-axis current reference increases abruptly at a beginning of the transition. This pattern of the transition takes the advantage in an induction motor where the torque components of winding currents can change very fast, but the flux linkage can only change slowly. This is an effective way to implement a pole change.

In an operation where there is only one active harmonic plane, and thus the torque and/or current changes have more freedom to implement. As such, there may be no need to synchronize the dynamics in different harmonic planes. In such case, this control scheme makes the torque reach the new target quickly and smoothly. In addition, it is possible to use only linear transition functions to achieve the increasing and/or decreasing transitions, and the rotor electromagnetic inertia may also be compensated by reference modifiers. This is a simple way to implement torque changes in a linear fashion. An example is expressed below:

$$T1r = T\left(1 - \frac{t}{Tc}\right) \quad (26)$$

$$Id1r = Id10\left(1 - \frac{t}{Tc}\right) + Id1m \quad (27)$$

$$Id1m = -\left(\frac{\tau_r}{Tc}\right)Id10 \quad (28)$$

$$Iq1r = Iq10 \quad (29)$$

$$T2r = T\left(\frac{t}{Tc}\right) \quad (30)$$

$$Id2r = Id20\left(\frac{t}{Tc}\right) + Id2m \quad (31)$$

$$Id2m = \left(\frac{\tau_r}{Tc}\right)Id20 \quad (32)$$

$$Iq2r = Iq20 \quad (33)$$

The ascending and/or descending transitions based on the equations above are shown in FIG. 13. T is the torque change for the transition. The torque of the harmonic plane may start from or change to zero during the process. The transition functions can be easily manipulated to reflect the actual demand. In FIG. 13, T1 set of equations (Y1, Y3 and Y4 shown in FIG. 13) are descending transition functions, and T2 set of equations (Y2, Y5 and Y6 shown in FIG. 13) are ascending transition functions. T1 set of equations and T2 set equations can also be used simultaneously to initiate transients on multiple harmonic planes such as in a pole number change process. T1 set of equations and T2 set equations may be used separately in one harmonic plane. For example, one may use T1 set of equations when the torque demand is reduced, and T2 set of equations when the torque demand is increased, in one harmonic plane.

As shown in FIG. 13, during the transition, the d-axis magnetizing component current references have a time-derivative modifier which is a constant value proportional to $\tau r$ and reciprocal to Tc. The q-axis torque component reference in the descending transition functions does not change until the end of the transition, while the change of the q-axis torque component reference in the ascending transition functions is imposed at the beginning of the transition. This set of transition functions may also be expanded to be used in transitions in multiple harmonic planes as long as the torques on these planes change in the same direction (e.g., increases or decreases simultaneously). With this control scheme, the torque changes on all harmonic planes can be divided into two groups if needed. One group includes the torque increasing in some harmonic planes, and the other group includes the torque decreasing in other harmonic planes. As such, the changes in these two groups can be made sequentially in two steps with reference changes in same direction in each group.

It should be noted that the implementation shown in FIG. 13 may be relatively simple. But, the performance should be poorer than the solution with trigonometric functions. For example, the power losses may be relatively high, and the disturbance may also be somewhat higher with the abrupt changes of the magnetizing current references at the beginning and the end of the transition.

The transition functions in solutions shown in FIGS. 9-11 can also be used to coordinate all torque changes on multiple harmonic planes simultaneously, in similar ways as described above with respect to FIG. 13 can coordinate to increase the torque or decrease the torque in one or multiple harmonic planes.

Figure 14:
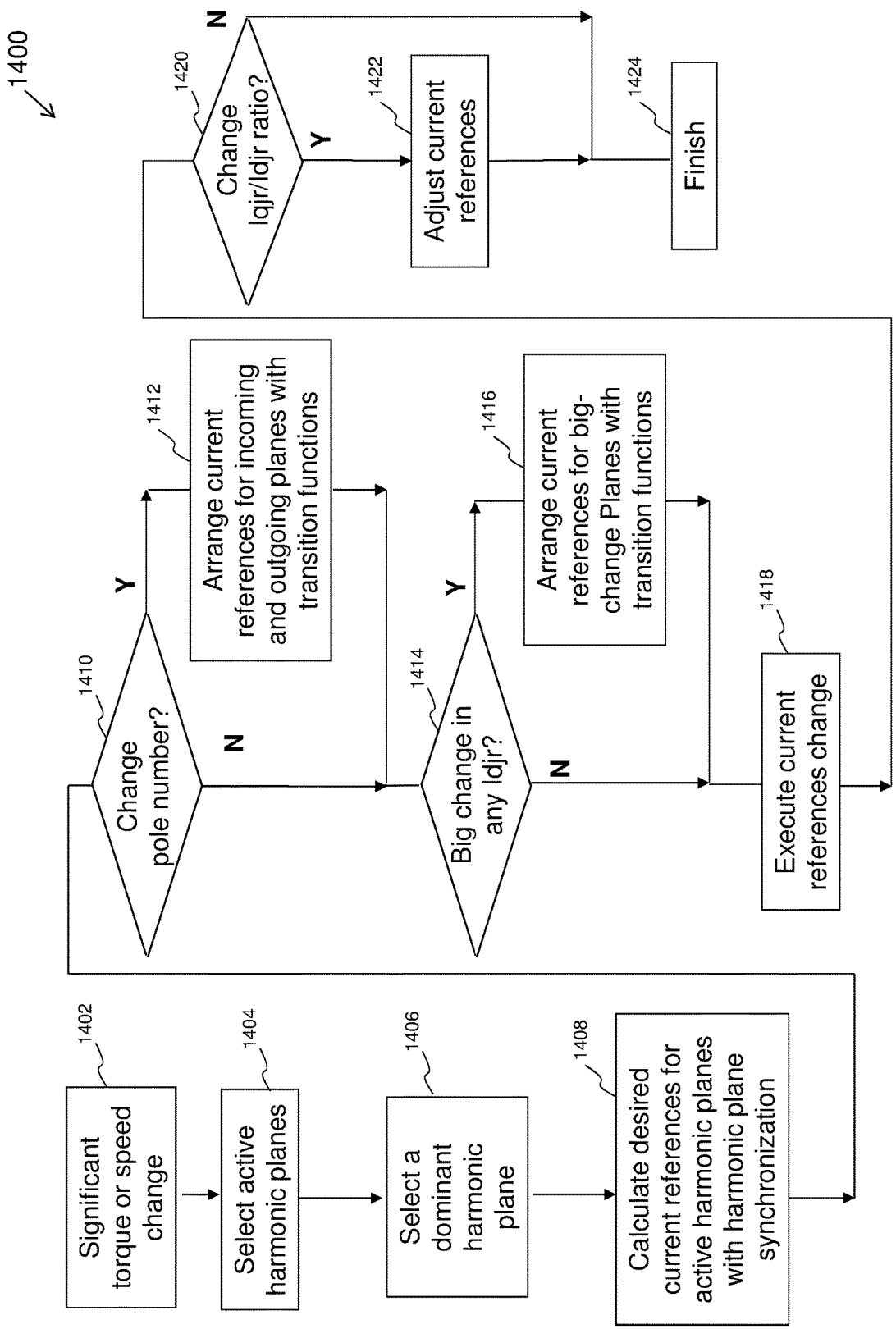
FIG. 14 illustrates a flow chart of applying a FOC method for controlling the motor system shown in FIG. 1 in accordance with various embodiments of the present application.

FIG. 14 illustrates a flow chart of applying a FOC method for controlling the motor system shown in FIG. 1 in accordance with various embodiments of the present application. This flowchart shown in FIG. 14 is merely an example, which should not unduly limit the scope of the claims. One of ordinary skill in the art would recognize many variations, alternatives, and modifications. For example, various steps as illustrated in FIG. 14 may be added, removed, replaced, rearranged and repeated.

The method 1400 starts at step 1402. At step 1402, the multi-harmonic FOC is used in a practical system where a significant transient is needed due to a big torque requirement or speed change.

At step 1404, active harmonic planes are selected by considering the system requirement and operating status including the need of saturation alleviation or the torque increase through harmonic injection. The torque requirement is divided among the active harmonic planes properly.

At step 1406, among the active harmonic planes, a dominant harmonic plane is selected. At step 1408, initial current references are calculated using the harmonic plane synchronization technique. The slip synchronization is used for induction motors. The slip is unchanged at this step.

At step 1410, a controller determines whether a pole number change is needed. If a pole change is needed, the method 1400 proceeds to step 1412. Otherwise, the method proceeds to step 1414. At step 1412, a pole change process is initiated. Correct transition functions are chosen for the outgoing and incoming dominant harmonic planes. After executing step 1412, the method proceeds to step 1414.

At step 1414, the controller determines whether big changes are needed for magnetizing current in any other harmonic plane. If big changes are needed, the method 1400 proceeds to step 1416. Otherwise, the method proceeds to step 1418. At step 1416, the torque increase and decrease changes may be implemented simultaneously with proper transition functions. Alternatively, the torque increase and decrease changes may be implemented in sequence by applying ascending transition functions and descending transition functions separately in multiple steps. After executing step 1416, the method proceeds to step 1418.

At step 1418, the current reference changes are executed. At step 1420, the controller determines whether the ratios of the torque and the magnetizing components in the active planes need to be adjusted for adjusting the slip. If the ratios need to be adjusted, the method 1400 proceeds to step 1422. Otherwise, the method proceeds to step 1424 where the method 1400 finishes. At step 1422, the current references are further adjusted.

It should be noted that steps of the pole change, big magnetizing current change, and the slip adjustment may be rearranged in a different sequence if necessary, and the action of increasing magnetizing currents may start early whenever possible since more magnetizing currents help to make the dynamics faster and more stable.

The multi-harmonic FOC techniques disclosed above can be applied to various poly-phase machines. However, for different machines, the synchronization mechanism can be different. For examples, in synchronous machines, for each active harmonic plane, the torque and/or magnetizing components of stator currents can be set to be proportional to the amplitude of the magnetic field strength at the same harmonic order, generated by magnets or magnetizing windings, in the stator, air gap, or the rotor, or used to selectively reduce the magnetic saturation in various parts of the magnetic path.

Although embodiments of the present disclosure and its advantages have been described in detail, it should be understood that various changes, substitutions and alterations can be made herein without departing from the spirit and scope of the disclosure as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A method comprising:
configuring a motor drive system with a motor/generator and a plurality of inverters coupled to the motor/generator;
configuring a plurality of active harmonic planes to generate a torque on each of the active harmonic planes; and
applying a harmonic plane synchronization control mechanism to the plurality of active harmonic planes so that torque components and magnetizing components of currents are controlled in coordination on different active harmonic planes to output a desired torque from the motor/generator.

2. The method of claim 1, wherein:
a plurality of windings of the motor/generator is so configured that a pole number of the motor/generator can be adjusted by changing a phase shift between currents in adjacent windings.

3. The method of claim 1, further comprising:
injecting a higher order harmonic to a magnetizing component of motor/generator currents through a saturation alleviation block to avoid or reduce a magnetic saturation in a region of the motor/generator; and
injecting another harmonic current at the same order to a torque component of the motor/generator to generate a torque in a corresponding harmonic plane.

4. The method of claim 1, further comprising:
adding a harmonic of a higher order into voltages of windings of the motor/generator through duty cycle control; and
controlling harmonic currents at the same order such that a torque is generated at a corresponding harmonic plane.

5. The method of claim 1, wherein:
the motor/generator is a synchronous machine, and wherein a harmonic current is added in response to a harmonic at the same order in the flux in a stator, an air gap, or a rotor of the motor/generator.

6. The method of claim 1, further comprising:
detecting magnetizing components of the currents in a plurality of harmonic planes; and
adjusting a torque component of the currents in a harmonic plane according to a magnetizing component in the same harmonic plane.

7. The method of claim 1, further comprising:
during a transition, gradually reducing a magnetizing current reference in a first harmonic plane and gradually increasing a magnetizing current reference in a second harmonic plane, wherein a total torque of the motor/generator is maintained approximately constant.

8. The method of claim 1, further comprising:
configuring the motor/generator to operate in a first operating mode with a first dominant harmonic plane and a first number of pole pairs; and
configuring the motor/generator to operate in a second operating mode with a second dominant harmonic plane and a second number of pole pairs, wherein during a transition from the first operating mode to the second operating mode, a pole number change of the motor/generator is implemented as torque and magnetizing current reference changes on the first and second dominant harmonic planes.

9. The method of claim 1, further comprising:
during a transition, reducing a first magnetizing current in a first harmonic plane and increasing a second magnetizing current in a second harmonic plane in a non-linear manner.

10. The method of claim 9, wherein:
non-linear changes of the first magnetizing current and the second magnetizing current are trigonometric functions and have a modifier term which is approximately proportional to a rotor electromagnetic time constant of the motor/generator, and wherein nonlinear changes of a first torque current in the first harmonic plane and a second torque current in the second harmonic plane are configured such that a sum of torque produced in the first harmonic plane and in the second harmonic plane is approximately constant during the transition.

11. The method of claim 1, further comprising:
during a fast transition, adding a modifier formed by a time-derivative term of a desired magnetic linkage to a corresponding magnetizing component reference on a harmonic plane, wherein the modifier is proportional to an electromagnetic time constant of a rotor of the motor/generator, so a torque generated in the harmonic plane follows a desired pattern.

12. The method of claim 1, further comprising:
during a transition, changing a harmonic current reference in a d-axis gradually, wherein a q-axis harmonic current reference in a decreasing transition is maintained constant until the end of the transition, and a change of the q-axis harmonic current reference in an increasing transition is imposed at a beginning of the transition.

13. The method of claim 1, wherein:
the motor/generator is an inductor machine; and
the harmonic plane synchronization control mechanism is a slip synchronization to coordinate a reference of d-axis component of current and a reference of q-axis component of current on multiple harmonic planes among the plurality of active harmonic planes.

14. A system comprising:
a motor/generator having a plurality of windings, a rotor and a stator magnetically coupled to the rotor;
a plurality of power converters connected to respective windings, wherein the plurality of power converters is configured to control currents of the plurality of windings; and
a controller configured to configure a plurality of harmonic currents in a plurality of active harmonic planes to generate a torque on each of the plurality of active harmonic planes, and apply a harmonic plane synchronization control mechanism to the plurality of harmonic currents in different harmonic planes so that current control on different harmonic planes is coordinated to output a desired torque from the motor/generator.

15. The system of claim 14, wherein the controller comprises a multi-harmonic Park and Clarke transform block configured to:

receive a plurality of phase currents of the motor/generator; and
convert the plurality of phase currents into d-q frame variables at different harmonic frequencies.

16. The system of claim 15, wherein the controller comprises a multi-harmonic field oriented control block configured to:
generate dominant current references based on d-q frame variables in a dominant harmonic plane; and
generate a plurality of current references on the different harmonic planes through a slip synchronization determined by the dominant current references based on a field-oriented control principle.

17. The system of claim 14, wherein:
the motor/generator is an induction motor; and
the number of poles and the number of phases of the motor/generator are dynamically reconfigurable.

18. A method comprising:
configuring a motor drive system with a motor/generator and an inverter, wherein:
the motor/generator has a plurality of windings arranged into a plurality of winding groups; and
the inverter has a plurality of power converter groups, and wherein each power converter group is configured to control currents of a winding group;
configuring a plurality of harmonic currents in a plurality of active harmonic planes to generator a torque on each active harmonic plane; and
applying a harmonic plane synchronization control mechanism to the plurality of active harmonic planes so that current control on different harmonic planes is coordinated to output a desired torque from the motor/generator.

19. The method of claim 18, further comprising:
dynamically adjusting the number of poles of the motor drive system by adjusting current references in different active harmonic planes.

20. The method of claim 18, further comprising:
during a transition, gradually reducing harmonic currents in a first harmonic plane and gradually increasing harmonic currents in a second harmonic plane, wherein a total torque of the motor/generator is maintained approximately constant.

* * * * *